United States Patent
Sakuma

(10) Patent No.: US 12,545,800 B2
(45) Date of Patent: Feb. 10, 2026

(54) REACTION LIQUID FOR PIGMENT PRINTING, INK SET, AND RECORDING METHOD

(71) Applicant: SEIKO EPSON CORPORATION, Tokyo (JP)

(72) Inventor: Daisuke Sakuma, Minowa (JP)

(73) Assignee: SEIKO EPSON CORPORATION (JP)

( * ) Notice: Subject to any disclaimer, the term of this patent is extended or adjusted under 35 U.S.C. 154(b) by 237 days.

(21) Appl. No.: 18/451,339

(22) Filed: Aug. 17, 2023

(65) Prior Publication Data

US 2024/0059924 A1 Feb. 22, 2024

(30) Foreign Application Priority Data

Aug. 18, 2022 (JP) ................. 2022-130589

(51) Int. Cl.
| | | |
|---|---|---|
| *C09D 11/54* | (2014.01) | |
| *C09D 11/322* | (2014.01) | |
| *C09D 11/40* | (2014.01) | |
| *D06P 5/30* | (2006.01) | |

(52) U.S. Cl.
CPC ............ *C09D 11/54* (2013.01); *C09D 11/322* (2013.01); *C09D 11/40* (2013.01); *D06P 5/30* (2013.01)

(58) Field of Classification Search
CPC ....... C09D 11/322; C09D 11/38; C09D 11/54; C09D 11/40; C09D 11/30; C09D 11/033; B41M 5/0017; B41M 5/0011; B41M 5/0023; B41M 5/0064; B41M 5/0047; D06P 5/30; B41J 11/002
See application file for complete search history.

(56) References Cited

U.S. PATENT DOCUMENTS

| | | | | |
|---|---|---|---|---|
| 5,510,415 A | * | 4/1996 | Zahrobsky | D06P 1/5292 347/100 |
| 7,015,270 B2 | * | 3/2006 | Scharfe | D21H 19/36 428/32.38 |
| 2002/0077385 A1 | * | 6/2002 | Miyabayashi | C09D 11/40 523/160 |
| 2010/0214352 A1 | * | 8/2010 | Tsunoda | D06P 5/30 524/386 |
| 2012/0306976 A1 | * | 12/2012 | Kitagawa | D06P 5/30 347/100 |
| 2017/0355868 A1 | * | 12/2017 | Saiga | C09D 11/40 |
| 2018/0058002 A1 | * | 3/2018 | Ohashi | B41J 3/4078 |
| 2021/0170779 A1 | * | 6/2021 | Asakawa | C09D 11/033 |

FOREIGN PATENT DOCUMENTS

| | | |
|---|---|---|
| JP | 2004-169248 A | 6/2004 |
| JP | 2016-089288 A | 5/2016 |

* cited by examiner

*Primary Examiner* — John P Zimmermann
(74) *Attorney, Agent, or Firm* — Harness, Dickey & Pierce, P.L.C.

(57) ABSTRACT

A reaction liquid for pigment printing contains a polyvalent metal salt, a cationic polymer, a polyhydric alcohol, an alkali, and water. The alkali is an amine compound, and the reaction liquid is used by ejecting it by ink jet technology.

11 Claims, 4 Drawing Sheets

REACTION LIQUID FOR PIGMENT PRINTING, INK SET, AND RECORDING METHOD

The present application is based on, and claims priority from JP Application Serial Number 2022-130589, filed Aug. 18, 2022, the disclosure of which is hereby incorporated by reference herein in its entirety.

BACKGROUND

1. Technical Field

The present disclosure relates to a reaction liquid for pigment printing, an ink set, and a recording method.

2. Related Art

In the related art, textile printing using an ink composition containing a pigment as a colorant (pigment printing) has involved the treatment of attaching, to fabric, a reaction liquid that causes the aggregation of ingredients in the ink to improve the color strength of the colorant. Against this background, studies are ongoing on the ejection of the reaction liquid by ink jet technology in a recording method in which steps of reaction liquid attachment and ink attachment are performed with one recording apparatus.

For example, JP-A-2016-089288 discloses a reaction liquid containing a polyvalent metal compound. In pigment printing, this reaction liquid is applicable to wet-on-wet recording methods, in which steps from reaction liquid attachment and ink attachment are performed without a drying step therebetween.

Reaction liquids for pigment printing that are used by ejecting them by ink jet technology, however, have had the disadvantages of inferior color strength and rub fastness and pitting corrosion on metal components of the recording apparatus.

SUMMARY

According to an aspect of the present disclosure, a form of a reaction liquid for pigment printing contains a polyvalent metal salt; a cationic polymer; a polyhydric alcohol; an alkali; and water, wherein the alkali is an amine compound; and the reaction liquid is used by ejecting the reaction liquid by ink jet technology.

According to an aspect of the present disclosure, a form of an ink set includes a textile printing ink jet ink composition containing a pigment, a resin particle, and water; and the reaction liquid in the above form for pigment printing.

According to an aspect of the present disclosure, a form of a recording method includes an ink attachment step, in which an ink composition is attached to fabric by ink jet technology; and a reaction liquid attachment step, in which the reaction liquid in the above form for pigment printing is attached to the fabric by ink jet technology.

DESCRIPTION OF EMBODIMENTS

Figure 1:
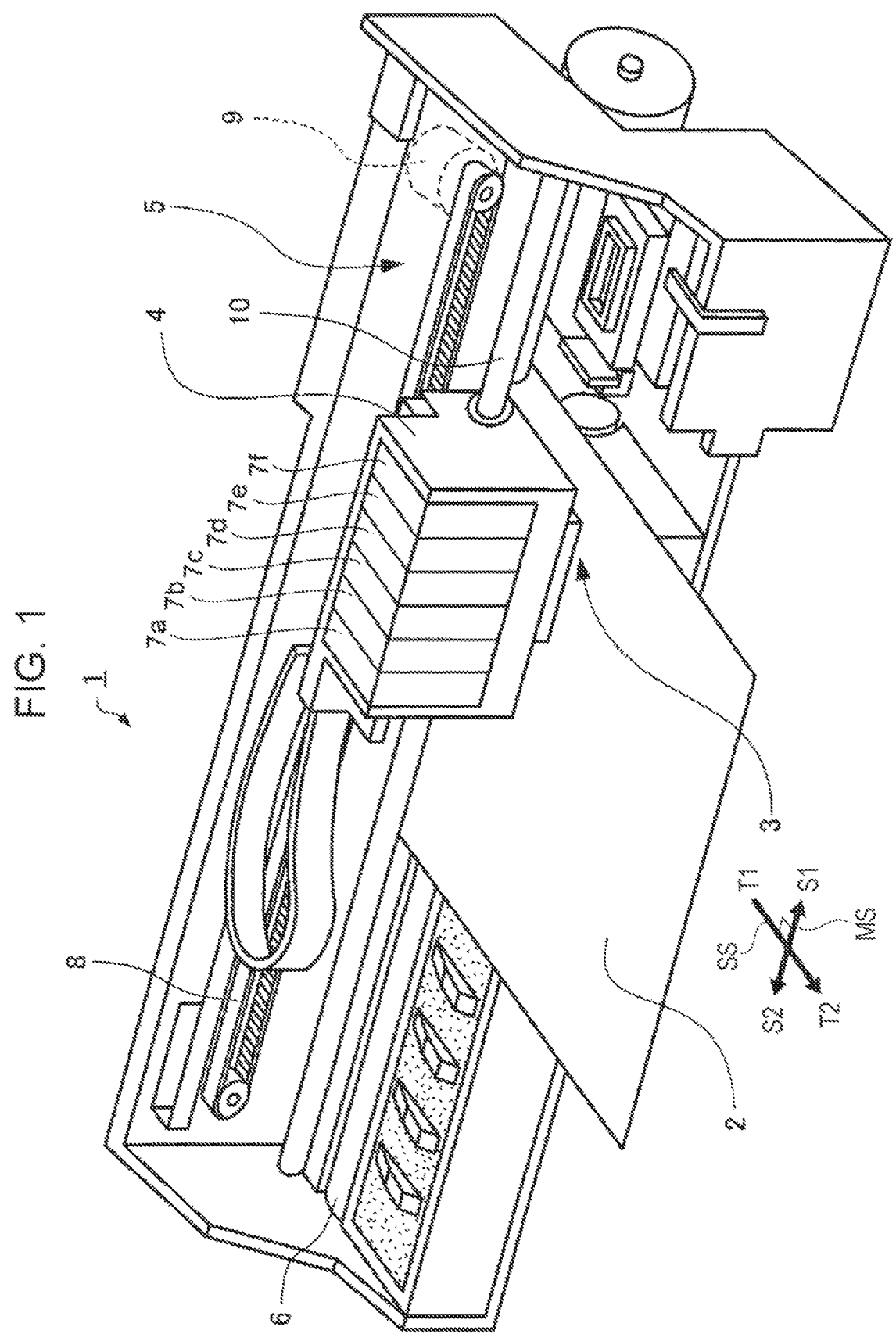
FIG. 1 is a schematic perspective view of an ink jet textile printing apparatus applicable to a recording method according to an embodiment.

Embodiments of the present disclosure will now be described. The following embodiments are descriptions of examples of the present disclosure. The present disclosure is never limited to the following embodiments and includes variations implemented without changing the gist of the present disclosure. Not all the configurations described below are essential configurations of the present disclosure.

1. REACTION LIQUID FOR PIGMENT PRINTING

A reaction liquid according to an embodiment of the present disclosure for pigment printing contains a polyvalent metal salt, a cationic polymer, a polyhydric alcohol, an alkali, and water. The alkali is an amine compound, and the reaction liquid is used by ejecting it by ink jet technology.

In the related art, ink jet pigment printing has involved the treatment of attaching, to fabric, a reaction liquid that causes the aggregation of ingredients in the ink to improve the color strength of the colorant. Typically, this treatment is performed by, for example, immersion using an apparatus/equipment different from the ink jet recording apparatus. In such a method, however, not only is there a need to use a separate apparatus/equipment, but also the use of the separate apparatus/equipment complicates the process and/or necessitates know-how. Such a method is also disadvantageous from the perspective of environmental impact because it produces liquid waste emissions.

To address this, studies are ongoing on ejecting not only the ink composition but also the reaction liquid by ink jet technology in ink jet pigment printing. Such a form of ejection requires no use of a separate apparatus/equipment, simplifies the process, and eliminates the liquid waste emissions.

Reaction liquids containing a polyvalent metal salt alone, however, have had a disadvantage. Color strength is good by virtue of the aggregation of the ink near the surface of the fabric, but rub fastness (wet rub fastness in particular) tend to be inferior as a result of the ink staying near the surface of the fabric. In response to this, it was lately found that incorporating a cationic polymer in the reaction liquid helps impart water resistance to the fabric and also leads to good rub fastness (wet rub fastness in particular). The use of a cationic polymer, however, has created a new disadvantage, pitting corrosion on metal components, such as a recording head, of the recording apparatus.

To address this, the reaction liquid according to this embodiment for pigment printing contains an amine compound as a specific alkali component. By virtue of the presence of the amine compound, color strength and rub fastness are good, and pitting corrosion of metal components, such as a recording head, is also reduced.

1.1 Applications

The reaction liquid according to this embodiment for pigment printing is used by ejecting it by ink jet technology.

"For pigment printing" refers to, for example, something for use in textile printing performed using an ink composition containing a pigment.

"Ink jet technology" is a recording method in which droplets, for example of an ink or reaction liquid, are ejected from nozzles of an ink jet head, for example of an ink jet recording apparatus, and attached to a recording medium.

The reaction liquid according to this embodiment for pigment printing is used by ejecting it by ink jet technology, unlike in known treatment methods. Thus, there is no need to use a separate apparatus/equipment, the process is simpler, and the liquid waste emissions are eliminated. The application of the reaction liquid by ink jet technology, furthermore, is unlikely to result in image bleeding compared with application by spraying or other non-ink jet techniques, even when a large volume of reaction liquid is applied. This is presumably because the reaction between the reaction liquid and the ink proceeds smoothly. In application by ink jet technology, ejection volumes can be controlled to be small, and the reaction liquid immediately comes into wet-on-wet contact with the ink at the same time.

In application by spraying or other non-ink jet techniques, it is difficult to control ejection volumes to be small. A drying step needs to be interposed, and thus the ink and the reaction liquid do not immediately come into wet-on-wet contact. As a result, the reaction between the reaction liquid and the ink is inferior. More specifically, after a large volume of reaction liquid is applied to fabric by spraying or a similar technique and dried, the reaction liquid itself penetrates into the fabric. The reaction between the dried ingredients in the reaction liquid and the ink is a solid/liquid reaction, and the cationic polymer is of low effectiveness in causing the aggregation of the ink. For such reasons, the ink, which lands after the reaction liquid, does not quickly aggregate, resulting in the penetration and bleeding of the ink.

It should be noted that a "reaction liquid" is not an ink composition used to color fabric but an auxiliary liquid used together with an ink composition. The reaction liquid is preferably capable of causing the aggregation or thickening of ingredients in an ink composition, more preferably contains an ingredient that causes the aggregation or thickening of ingredients in an ink composition. The reaction liquid may contain a colorant, but preferably with the colorant content being 0.2% by mass or less, more preferably 0.1% by mass or less, even more preferably 0.05% by mass or less of the total mass of the reaction liquid. The lower limit is 0% by mass. The reaction liquid preferably contains no colorant.

The individual ingredients contained in the reaction liquid according to this embodiment for pigment printing will now be described.

1.2 Polyvalent Metal Salt

The reaction liquid according to this embodiment for pigment printing contains a polyvalent metal salt. Polyvalent metal salts are highly effective in causing the aggregation of ingredients in an ink composition when coming into contact with the ink composition. The polyvalent metal salt, therefore, provides good color strength by causing the ink to aggregate near the surface of the fabric. The presence of an alkali in the reaction liquid can cause the cationic polymer to be degraded during prolonged storage of the reaction liquid, but with a polyvalent metal salt, good color strength tends to be maintained.

A polyvalent metal salt is a compound composed of a divalent or higher-valency metal ion and an anion. Examples of divalent or higher-valency metal ions include the ions of, for example, calcium, magnesium, copper, nickel, zinc, barium, aluminum, titanium, strontium, chromium, cobalt, and iron. Of such metal ions that constitute a polyvalent metal salt, it is particularly preferred that the metal ion be at least one of the calcium ion or the magnesium ion because of their superior ability to cause the aggregation of ingredients in ink. For the balance between aggregation and rub fastness, it is more preferred that the metal ion be the magnesium ion.

The polyvalent metal salt is preferably a magnesium salt. When the polyvalent metal salt is, for example, a calcium salt, aggregation is excellent, but rub fastness and on-fabric graininess may be inferior due to low controllability of the aggregation reaction. A magnesium salt, compared with a calcium salt and other different salts, undergoes a mild aggregation reaction with the ink, making the reaction easily controllable. With a magnesium salt, therefore, color strength tends to be good, and rub fastness and graininess also tend to be good.

The anion constituting the polyvalent metal salt is an inorganic or organic ion. Examples of such inorganic ions include the chloride ion, bromide ion, iodide ion, nitrate ion, sulfate ion, and hydroxide ions. Examples of organic ions include organic acid ions, such as the carboxylate ion.

The polyvalent metal salt is preferably a sulfate. When the polyvalent metal salt is, for example, a halide salt (salt of $Cl^-$, $Br^-$, $I^-$, etc.), a chloride salt (salt of $Cl^-$) in particular, pitting corrosion easily occurs on metal components of the recording apparatus. The mechanism behind this is as follows. First, part of a passivation film on the surface of the metal components (e.g., stainless steel) is broken by chloride ions. Whereas the passivation film has a higher potential, the broken portion has a lower potential. Thus a local cell is formed, and pitting corrosion proceeds. The chloride ions gather at the corroded portion, and the metal dissolves due to an increased chloride concentration. This causes the pH to decrease at the corroded portion and the dissolution of the metal to further proceed. Because these reactions take place locally inside the pit of the corroded portion, pitting corrosion continuously advances. When the polyvalent metal salt is a sulfate, pitting corrosion is further reduced because such reactions do not occur. For the same reason, it is preferred that the concentration of the chloride ion in the reaction liquid be low.

Any type of polyvalent metal salt can be used, but specific examples include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. One such polyvalent metal salt may be used alone, or two or more may be used in combination. Of these, it is preferred that the polyvalent metal salt be one or more selected from magnesium chloride, magnesium sulfate, magnesium carbonate, magnesium silicate, and magnesium acetate because in that case color strength is good, and rub fastness and graininess are also good. In particular, it is more preferred that the polyvalent metal salt be one or more selected from magnesium sulfate, magnesium carbonate, magnesium silicate, and magnesium acetate because in that case pitting corrosion is further reduced. These metal salts may have water of hydration in their raw material form.

The lower limit to the amount of the polyvalent metal salt is preferably 0.5% by mass or more, more preferably 1.0% by mass or more, even more preferably 1.5% by mass or more, particularly preferably 2.0% by mass or more, more particularly preferably 2.5% by mass or more of the total mass of the reaction liquid. The upper limit to the amount of the polyvalent metal salt is preferably 10% by mass or less, more preferably 8% by mass or less, even more preferably 6% by mass or less, still more preferably 5% by mass or less, particularly preferably 4% by mass or less, more particularly preferably 3.5% by mass or less of the total mass of the reaction liquid. When the amount of the polyvalent metal salt is in these ranges, color strength, rub fastness, and the reduction of pitting corrosion tend to be good in a balanced manner.

1.3 Cationic Polymer

The reaction liquid according to this embodiment for pigment printing contains a cationic polymer. Incorporating a cationic polymer helps impart water resistance to the fabric and leads to good rub fastness (wet rub fastness in particular).

Cationic polymer refers to a polymer having cationic properties. Examples of cationic polymers include cationic urethane resins, cationic olefin resins, and cationic amine resins. Of these, it is particularly preferred that the cationic polymer be a cationic amine polymer.

For cationic urethane resins, commercially available ones can be used. Examples of commercially available cationic urethane resins that can be used include HYDRAN CP-7010, CP-7020, CP-7030, CP-7040, CP-7050, CP-7060, and CP-7610 (trade names, Dainippon Ink and Chemicals, Inc.), SUPERFLEX 600, 610, 620, 630, 640, and 650 (trade names, DKS Co. Ltd.), and WBR-2120C and WBR-2122C urethane emulsions (trade names, Taisei Fine Chemical Co., Ltd.).

Cationic olefin resins are cationic resins having an olefin, such as ethylene or propylene, in their structural backbone, and one or more of them can be selected from known ones and used as needed. A cationic olefin resin may be in emulsion form, in which the resin has been dispersed in a solvent, including water and organic solvents. Commercially available cationic olefin resins can be used. Examples include ARROWBASE CB-1200 and CD-1200 (trade names, Unitika Ltd.).

For cationic amine resins, one or more of them can be selected from known ones and used as needed. It is, however, preferred that the resin or resins have a cationic functional group selected from a primary amine group, a secondary amine group, a tertiary amine group, a quaternary ammonium salt group, an imino group, and an amide group in its or their structure, and it is particularly preferred that the resin or resins have a quaternary ammonium salt group as the cationic functional group. With such a cationic amine resin or resins, color strength tends to be better. A cationic amine resin may have two or more types of the cationic functional groups listed above.

Examples of cationic amine resins having a primary amine group include polyallylamine, polyallylamine hydrochloride, polyallylamine amidosulfate, methoxycarbonylated allylamine polymers, methylcarbonylated allylamine acetate polymers, ureaized polyallylamine polymers, carboxymethylated polyallylamine polymers, and hexamethylenediamine/epichlorohydrin resins.

Commercially available cationic amine resins having a primary amine group can also be used. Examples include PAA-01, PAA-03, PAA-05, PAA-08, PAA-15C, and PAA-25; PAA-HCL-01, PAA-HCL-03, PAA-HCL-05, PAA-HCL-3L, and PAA-HCL-10L; PAA-SA; PAA-U5000 and PAA-U7030; PAA-AC5050A; PAA-N5000 and PAA-N5050CL; and PAA-CB-1 (Nittobo Medical) and UNISENCE KHE103L (Senka).

Examples of cationic amine resins having a secondary amine group include diallylamine polymers, diallylamine hydrochloride polymers, diallylamine hydrochloride-sulfur dioxide copolymers, diallylamine acetate-sulfur dioxide copolymers, diallylamine hydrochloride-acrylamide copolymers, dimethylamine/epichlorohydrin resins, dimethylamine/ammonia/epichlorohydrin resins, and dimethylamine-ethylenediamine-epichlorohydrin polymers.

Commercially available cationic amine resins having a secondary amine group can also be used. Examples include PAS-21; PAS-21CL; PAS-92; PAS-92A; and PAS-2141CL (Nittobo Medical), UNISENCE KHE104L; and UNISENCE KHE100L (Senka), and Catiomaster PE-30 (Yokkaichi Chemical).

Examples of cationic amine resins having a tertiary amine group include methyldiallylamine hydrochloride polymers, methyldiallylamine amidosulfate polymers, methyldiallylamine acetate polymers, methyldiallylamine hydrochloride-sulfur dioxide copolymers, and dicyandiamide-polyalkylene polyamine polycondensates.

Commercially available cationic amine resins having a tertiary amine group can also be used. Examples include PAS-M-1L and PAS-M-1; PAS-22SA-40; PAS-M-1A; and PAS-2201CL (Nittobo Medical) and UNISENCE KHP10L (Senka).

Resins such as Suparamil C-305 (Toho Chemical Industry), ARAFIX 255 and 251S (Arakawa Chemical), JETFIX 38A, 220, 260, N700, and 90X (Satoda Chemical Industrial), and WS4020, WS4030, WS4027, PA6646, and DK6854 (Seiko PMC), furthermore, are also examples of commercially available cationic amine resins having a primary, secondary, or tertiary amine group.

Examples of cationic amine resins having a quaternary ammonium salt group include diallyldimethylammonium chloride polymers, diallylmethylethylammonium ethyl sulfate polymers, diallylmethylethylammonium ethyl sulfate-sulfur dioxide copolymers, diallyldimethylammonium chloride-sulfur dioxide copolymers, and diallyldimethylammonium chloride-acrylamide copolymers.

Commercially available cationic amine resins having a quaternary ammonium salt group can also be used. Examples include PAS-H-1L, PAS-H-5L, and PAS-H-10L; PAS-24; PAS-2401; PAS-A-1 and PAS-A-5; and PAS-J-81L, PAS-J-81, and PAS-J-41 (Nittobo Medical), EP-1137 (Takamatsu Oil & Fat), and PAPYOGEN P-105, MILLIOGEN P-20, UNISENCE FPA100L, and UNISENCE KHE107L (Senka).

Examples of cationic amine resins having an imino group include polyethyleneimine, octadecyl isocyanate-modified polyethyleneimine, and propylene oxide-modified polyethylene imine.

Commercially available cationic amine resins having an imino group can also be used. Examples include SP-003, SP-006, SP-012, SP-018, SP-200, HM-2000, P-1000, and P-3000; RP-20; and PP-061 (Nippon Shokubai) and Lupasol (BASF).

Examples of cationic amine resins having an amide group include polyamide and polyamide epoxy resins. Examples of commercially available cationic amide resins having an amide group include Sumirez Resin 633, 630 (30), 675A, 6615, 6725, and SLX-1 (Taoka Chemical).

Examples of cationic amine resins having two or more types of cationic functional groups include the following.

Examples of cationic amine resins having primary and secondary amine groups include allylamine-diallylamine copolymers and allylamine acetate-diallylamine acetate copolymers. Examples of commercially available ones include PAA-D11; and PAA-D19A (Nittobo Medical).

Examples of cationic amine resins having primary amine and quaternary ammonium salt groups include allylamine-diallyldimethylammonium chloride copolymers. An example of a commercially available one is PAA-1123 (Nittobo Medical).

Examples of cationic amine resins having tertiary amine and quaternary ammonium salt groups include methyldiallylamine-diallyldimethylammonium chloride copolymers and diallyldimethylammonium chloride-3-chloro-2-hydroxypropylated diallylamine hydrochloride copolymers. Examples of commercially available ones include PAA-2223; and PAS-880 (Nittobo Medical).

One cationic polymer may be used alone, or two or more may be used in combination.

The cationic polymer preferably has an epihalohydrin-derived structure. An epihalohydrin is a monomer having an epoxy group and a halogeno group. Examples of halogeno groups include the fluoro, chloro, bromo, iodo, and astato groups. The epihalohydrin is more preferably epichlorohydrin, in which the halogeno group is a chloro group. When the cationic polymer has an epihalohydrin-derived structure, an epoxy group that remains unreacted, for example, of the epihalohydrin is contributable to the crosslinking reaction as a crosslinking group. By virtue of this, therefore, the ink more easily thickens and aggregates, and color strength tends to be further improved. The ink layer is toughened through crosslinking, and thus a better degree of rub fastness tends to be achieved. When the fabric is, for example, cotton, a crosslinking reaction occurs between the crosslinking group derived from the epihalohydrin and the hydroxyl groups in the cellulose in the cotton, further improving the adhesion between the fabric and the ink layer. In that case, a better degree of rub fastness tends to be achieved.

The cationic polymer having an epihalohydrin-derived structure is more preferably a cationic amine resin having an epihalohydrin-derived structure. Examples of such polymers include polyamine-epihalohydrin copolymers, polyamide-epihalohydrin copolymers, polyamide polyamine-epihalohydrin copolymers, and amine-epihalohydrin copolymers.

The cationic polymer having an epihalohydrin-derived structure may be a commercially available one. Examples include Kymene 557 (SOLENIS), MILLIOGEN P-20, UNISENCE FPA 100L, and UNISENCE KHE 107L (Senka), WS-4020, 4030, 4027, and TS-4070 (Seiko PMC, polyamide-epichlorohydrin polymers) and WS-4011 (Seiko PMC, a polyamine-epichlorohydrin polymer), AF-100, 251S, 255, 255LOX, and 2500 (Arakawa Chemical, polyamide polyamine-epichlorohydrin polymers), Catiomaster PE-30 (Yokkaichi Chemical, a dimethylamine-ethylenediamine-epichlorohydrin condensate), and EPA-SK01 (Yokkaichi Chemical, a polyamide polyamine-epichlorohydrin condensate).

The mass-average molecular weight of the cationic polymer is preferably 100,000 or less, more preferably 80,000 or less, even more preferably 60,000 or less, particularly preferably 40,000 or less, more particularly preferably 20,000 or less. The lower limit to the mass-average molecular weight of the cationic polymer can be any value, but preferably is 100 or more, more preferably 1000 or more, even more preferably 5000 or more. When the mass-average molecular weight of the cationic polymer is 100,000 or less, ejection performance in the application of the reaction liquid by ink jet technology tends to be better. The mass-average molecular weight can be measured using gel permeation chromatography (a GPC instrument) with polyethylene glycol as a standard polymer.

The amount of the cationic polymer is preferably from 0.5% to 5.0% by mass, more preferably from 1.0% to 4.5% by mass, more preferably from 1.5% to 4.0% by mass, particularly preferably from 2.0% to 3.5% by mass, more particularly preferably from 2.0% to 3.0% by mass of the total amount of the reaction liquid. When the amount of the cationic polymer is 0.5% by mass or more, rub fastness tends to be good. When the amount of the cationic polymer is 5.0% by mass or less, it tends to be easier to make the viscosity of the reaction liquid suitable to ink jet technology, and intermittent printing stability tends to be good.

1.4 Polyhydric Alcohol

The reaction liquid according to this embodiment for pigment printing contains a polyhydric alcohol. Polyhydric alcohols are a type of organic solvent. A reaction liquid containing a cationic polymer is likely to have high viscosity even when the evaporation of water from the reaction liquid is minor. When a reaction liquid containing a cationic polymer is ejected by ink jet technology, therefore, ejection stability (intermittent printing stability in particular) is likely to be inferior. Incorporating a polyhydric alcohol in the reaction liquid tends to lead to good moisture retention and good ejection stability of the reaction liquid. Polyhydric alcohols, furthermore, appear to help limit the degradation of the cationic polymer. With a polyhydric alcohol, therefore, it may be possible to impart water resistance to the fabric and achieve good rub fastness (wet rub fastness in particular) even after prolonged storage of the reaction liquid. The incorporation of a polyhydric alcohol also reduces the formation of mist by slowing down the drying of the droplets ejected by ink jet technology. With a polyhydric alcohol, therefore, the adhesion of the reaction liquid near the nozzle surface of the head tends to be reduced, and the impact of pitting corrosion tends to be even smaller.

A polyhydric alcohol is an alcohol having two or more hydroxyl groups in its molecule, preferably three or more hydroxyl groups in its molecule. Examples of polyhydric alcohols include alkanediols and polyols, and preferably the polyhydric alcohol is one or more selected from these. The state of the polyhydric alcohol at room temperature and atmospheric pressure may be liquid or may be solid, but preferably is liquid.

Alkanediols are compounds in which, for example, an alkane is substituted with two hydroxyl groups. Examples of alkanediols include ethylene glycol (also known as: ethane-1,2-diol), propylene glycol (also known as: propane-1,2-diol), 1,2-butanediol, 1,2-pentanediol, 1,2-hexanediol, 1,2-octanediol, 1,3 propanediol, 1,3-butylene glycol (also known as: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, and 2-methyl-2-propyl-1,3-propanediol.

Examples of polyols include condensates in which two or more alkanediol molecules have undergone intermolecular condensation between hydroxyl groups, and compounds having three or more hydroxyl groups.

Examples of condensates in which two or more alkanediol molecules have undergone intermolecular condensation between hydroxyl groups include dialkylene glycols, such as diethylene glycol and dipropylene glycol, and trialkylene glycols, such as triethylene glycol (normal boiling point, 287° C.) and tripropylene glycol.

The compounds having three or more hydroxyl groups are those compounds having three or more hydroxyl groups that have an alkane or polyether structure as their backbone. Examples of compounds having three or more hydroxyl groups include glycerol (normal boiling point, 290° C.), trimethylolethane, trimethylolpropane, 1,2,5-hexanetriol, 1,2,6-hexanetriol, pentaerythritol, and polyoxypropylenetriol.

The amount of the polyhydric alcohol is preferably from 5% to 50% by mass, more preferably from 10% to 40% by mass, even more preferably from 15% to 35% by mass, particularly preferably from 20% to 35% by mass, more particularly preferably from 20% to 30% by mass of the total amount of the reaction liquid. When the amount of the polyhydric alcohol is in these ranges, the balance between moisture retention and dryability tends to be excellent, and both intermittent printing stability and rub fastness tend to be good.

1.4.1 Polyhydric Alcohol Having a Normal Boiling Point of 250° C. or Above

The reaction liquid according to this embodiment for pigment printing may contain a polyhydric alcohol having a normal boiling point of 250° C. or above. Alternatively, the polyhydric alcohol contained may be a polyhydric alcohol having a normal boiling point of 250° C. or above. In such cases, the moisture retention of the reaction liquid tends to be better, and ejection stability tends to be better. For the reduction of VOC (volatile organic compound) issues, too, it is preferred that the normal boiling point of the polyhydric alcohol be 250° C. or above.

Examples of polyhydric alcohols having a normal boiling point of 250° C. or above include triethylene glycol (normal boiling point, 287° C.), trimethylolpropane (normal boiling point, 295° C.), and glycerol (normal boiling point, 290° C.) for polyols having a normal boiling point of 250° C. or above. Of these, it is particularly preferred that the polyhydric alcohol be glycerol because in that case moisture retention is better, and intermittent printing stability is better. For the same reason, the polyhydric alcohol having a normal boiling point of 250° C. or above preferably has a normal boiling point of 260° C. or above, more preferably a normal boiling point of 270° C. or above, even more preferably a normal boiling point of 280° C. or above, particularly preferably a normal boiling point of 285° C. or above.

The amount of the polyhydric alcohol having a normal boiling point of 250° C. or above can be any amount, but preferably is 0.5% by mass or more, more preferably 1.0% by mass or more, even more preferably 3.0% by mass or more, still more preferably 5.0% by mass or more, particularly preferably 10% by mass or more of the total amount of the reaction liquid. The upper limit can be any value, but preferably is 30% by mass or less, more preferably 25% by mass or less, even more preferably 20% by mass or less, still more preferably 18% by mass or less, particularly preferably 15% by mass or less. When the amount of polyhydric alcohols having a normal boiling point of 250° C. or above is in these ranges, the balance between moisture retention and dryability tends to be excellent, and both intermittent printing stability and rub fastness tend to be good.

1.4.2 Polyhydric Alcohol Having a Normal Boiling Point of 230° C. or Below

The reaction liquid according to this embodiment for pigment printing may further contain a polyhydric alcohol having a normal boiling point of 230° C. or below. The above polyhydric alcohol having a normal boiling point of 250° C. or above is superior in moisture retention and thus causes the solvent not to dry quickly but remain on the fabric. This may inhibit the reaction of the cationic polymer inhibited and may cause rub fastness to be often inferior. The incorporation of a polyhydric alcohol having a normal boiling point of 230° C. or below may lead to good rub fastness because it mitigates this problem and ensures good reactivity of the cationic polymer.

Examples of polyhydric alcohols having a normal boiling point of 230° C. or below include ethylene glycol (normal boiling point, 197° C.), propylene glycol (normal boiling point, 188° C.), 1,2-butanediol (normal boiling point, 192° C.), 1,2-hexanediol (normal boiling point, 223° C.), 1,3-propanediol (normal boiling point, 213° C.), 1,3-butylene glycol (normal boiling point, 207° C.), 1,4-butanediol (normal boiling point, 230° C.), 2-ethyl-2-methyl-1,3-propanediol (normal boiling point, 226° C.), 2-methyl-1,3-propanediol (normal boiling point, 214° C.), 2,2-dimethyl-1,3-propanediol (normal boiling point, 210° C.), 3-methyl-1,3-butanediol (normal boiling point, 203° C.), and 2-methylpentane-2,4-diol (normal boiling point, 197° C.) for alkanediols having a normal boiling point of 230° C. or below. Of these, it is particularly preferred that the polyhydric alcohol having a normal boiling point of 230° C. or below be one or more selected from propylene glycol and 1,3-butylene glycol, more preferably propylene glycol. When the polyhydric alcohol having a normal boiling point of 230° C. or below is such a compound or compounds, the reaction of the cationic polymer tends to be inhibited to an even lesser extent, and rub fastness tends to be better. For the same reason, the polyhydric alcohol having a normal boiling point of 230° C. or below preferably has a normal boiling point of 220° C. or below, more preferably a normal boiling point of 210° C. or below, even more preferably a normal boiling point of 200° C. or below, particularly preferably a normal boiling point of 190° C. or below.

The amount of the polyhydric alcohol having a normal boiling point of 230° C. or below can be any amount, but preferably is 0.5% by mass or more, more preferably 1.0% by mass or more, even more preferably 3.0% by mass or more, still more preferably 5.0% by mass or more, particularly preferably 10% by mass or more of the total amount of the reaction liquid. The upper limit can be any value, but preferably is 30% by mass or less, more preferably 25% by mass or less, even more preferably 20% by mass or less, still more preferably 18% by mass or less, particularly preferably 15% by mass or less. When the amount of polyhydric alcohols having a normal boiling point of 230° C. or below is in these ranges, the balance between moisture retention and dryability tends to be excellent, and both intermittent printing stability and rub fastness tend to be good.

1.5 Alkali

The reaction liquid according to this embodiment for pigment printing contains an alkali. Examples of alkalis include inorganic alkali compounds, such as hydroxides of alkali metals or alkaline earth metals; and organic alkali compounds, such as amine compounds. The alkali contained in the reaction liquid according to this embodiment for pigment printing is an amine compound. Because of the incorporation of an alkali in the reaction liquid, pitting corrosion is reduced, but the cationic polymer is degraded during prolonged storage of the reaction liquid. In that case it is impossible to impart water resistance to the fabric, and rub fastness (wet rub fastness in particular) is inferior. When the alkali is an amine compound, the degradation of the cationic polymer is limited. Even after prolonged storage of the reaction liquid, therefore, it is possible to impart water resistance to the fabric and achieve better rub fastness (wet rub fastness in particular), and pitting corrosion on metal components, such as a recording head, is also reduced.

Examples of amine compounds include primary amines, secondary amines, and tertiary amines. Ammonia is also included in amine compounds. The amine compound is different from the cationic polymer described above. The molecular weight of the amine compound can be any value, but preferably is 500 or less, more preferably 300 or less, even more preferably 250 or less, particularly preferably 200 or less. The lower limit to the molecular weight can be any value, but preferably is 40 or more, more preferably 80 or more, even more preferably 120 or more.

The alkali preferably contains one or more selected from primary, secondary, and tertiary amines, more preferably contains a tertiary amine. In particular, when the alkali contains a tertiary amine, the degradation of the cationic polymer tends to be further limited. Even after prolonged storage of the reaction liquid, therefore, it tends to be possible to impart water resistance to the fabric and achieve better rub fastness (wet rub fastness in particular), and pitting corrosion on metal components, such as a recording head, also tends to be reduced.

A reaction liquid containing a cationic polymer is likely to have high viscosity even when the evaporation of water from the reaction liquid is minor. When a reaction liquid containing a cationic polymer is ejected by ink jet technology, therefore, ejection stability (intermittent printing stability in particular) is likely to be inferior. When the alkali contains a tertiary amine, the moisture retention of the reaction liquid tends to be good because tertiary amines are slow to dry. When the alkali contains a tertiary amine, therefore, ejection stability (intermittent printing stability in particular) tends to be good.

Examples of primary amines include methylamine, ethylamine, n-propylamine, isopropylamine, n-butylamine, isobutylamine, sec-butylamine, and tert-butylamine.

Examples of secondary amines include N,N-dimethylamine, N,N-diethylamine, N,N-di-n-propylamine, N,N-diisopropylamine, N,N-di-n-butylamine, N,N-diisobutylamine, and N,N-di-sec-butylamine.

Examples of tertiary amines include trimethylamine, triethylamine, tri-n-propylamine, tri-n-butylamine, triethanolamine, triisopropanolamine, and trishydroxymethylaminomethane.

One alkali may be used alone, or two or more may be used in combination.

The pKa of the alkali contained in the reaction liquid according to this embodiment for pigment printing is preferably from 7.0 to 11.0, more preferably from 7.0 to 10.5, even more preferably from 7.0 to 10.0, particularly preferably from 7.0 to 9.5, more particularly preferably from 7.0 to 9.0, further preferably from 7.5 to 8.5. When the pKa of the alkali is in these ranges, the degradation of the cationic polymer tends to be further limited. Even after prolonged storage of the reaction liquid, therefore, it tends to be possible to impart water resistance to the fabric and achieve better rub fastness (wet rub fastness in particular), and pitting corrosion on metal components, such as a recording head, also tends to be reduced.

It should be noted that "pKa" herein represents the acid dissociation constant in water. The base dissociation constant pKb can be converted from the autodissociation constant of the solvent, provided that the acid dissociation constant pKa is known. In particular, when the solvent is water, pKa+pKb=14.

The amount of the alkali contained in the reaction liquid according to this embodiment for pigment printing is preferably from 0.1% to 3.0% by mass, more preferably from 0.3% to 2.5% by mass, even more preferably from 0.5% to 2.0% by mass, still more preferably from 0.7% to 1.5% by mass, particularly preferably from 0.8% to 1.2% by mass of the total amount of the reaction liquid. When the amount of the alkali is in these ranges, pitting corrosion tends to be reduced well, and the degradation of the cationic polymer tends to be further limited. Even after prolonged storage of the reaction liquid, therefore, it tends to be possible to impart water resistance to the fabric and achieve better rub fastness (wet rub fastness in particular), and pitting corrosion on metal components, such as a recording head, also tends to be reduced.

1.6 Water

The reaction liquid according to this embodiment for pigment printing contains water. Examples of types of water include water in which ionic impurities have been reduced, like deionized water, ultrafiltered water, reverse osmosis water, distilled water, and other types of purified water and ultrapure water. The use of sterilized water, for example sterilized by ultraviolet irradiation or adding hydrogen peroxide, helps limit the development of bacteria and fungi during prolonged storage of the reaction liquid.

The amount of water is preferably 30% by mass or more, more preferably 40% by mass or more, even more preferably 45% by mass or more, still more preferably 50% by mass or more, particularly preferably 55% by mass or more, more particularly preferably 60% by mass or more of the total amount of the reaction liquid. With an amount of water in these ranges, the reaction liquid for pigment printing is of relatively low viscosity. The upper limit to the amount of water can be any value, but preferably is 90% by mass or less, more preferably 85% by mass or less, even more preferably 80% by mass or less of the total amount of the reaction liquid.

1.7 Ratios Between Amounts

For the reaction liquid according to this embodiment for pigment printing, it is preferred that the ratio between amounts ($M_2/M_1$) be from 0.1 to 10, where $M_1$ is the amount of polyhydric alcohols having a normal boiling point of 250° C. or above in relation to the total amount of the reaction liquid, and $M_2$ is the amount of polyhydric alcohols having a normal boiling point of 230° C. or below in relation to the total amount of the reaction liquid. The upper limit to the ratio between amounts ($M_2/M_1$) is more preferably 8 or less, even more preferably 6 or less, still more preferably 4 or less, particularly preferably 3 or less, more particularly preferably 2 or less, further preferably 1.5 or less. The lower limit to the ratio between amounts ($M_2/M_1$) is preferably 0.2 or greater, more preferably 0.4 or greater, even more preferably 0.6 or greater, particularly preferably 0.8 or greater. When the ratio between amounts ($M_2/M_1$) is in these ranges, the balance between moisture retention and dryability tends to be excellent, and both intermittent printing stability and rub fastness tend to be good.

For the reaction liquid according to this embodiment for pigment printing, it is preferred that the ratio between amounts ($M_1/M_3$) be from 0.5 to 20, where $M_1$ is the amount of polyhydric alcohols having a normal boiling point of 250° C. or above in relation to the total amount of the reaction liquid, and $M_3$ is the amount of the cationic polymer in relation to the total amount of the reaction liquid. The upper limit to the ratio between amounts ($M_1/M_3$) is preferably 15 or less, more preferably 10 or less, even more preferably 8 or less. The lower limit to the ratio between amounts ($M_1/M_3$) is preferably 1 or greater, more preferably 2 or greater, even more preferably 3 or greater, still more preferably 4 or greater, particularly preferably 5 or greater. When the ratio between amounts ($M_1/M_3$) is in these ranges, the balance between the reactivity of the cationic polymer and moisture retention tends to be excellent, and both intermittent printing stability and rub fastness tend to be good.

For the reaction liquid according to this embodiment for pigment printing, it is preferred that the ratio between amounts ($M_3/M_4$) be from 0.1 to 3.0, where $M_3$ is the amount of the cationic polymer in relation to the total amount of the reaction liquid, and $M_4$ is the amount of the polyvalent metal salt in relation to the total amount of the reaction liquid. The upper limit to the ratio between amounts ($M_3/M_4$) is preferably 2.0 or less, more preferably 1.5 or less, even more preferably 1.2 or less, still more preferably 1.0 or less. The lower limit to the ratio between amounts ($M_3/M_4$) is preferably 0.2 or greater, more preferably 0.3 or greater, even more preferably 0.4 or greater, particularly preferably 0.5 or greater, more particularly preferably 0.6 or greater. When the ratio between amounts ($M_3/M_4$) is in these ranges, color strength, rub fastness, and intermittent printing stability can be good in a balanced manner.

For the reaction liquid according to this embodiment for pigment printing, it is preferred that the ratio between amounts ($M_5/M_3$) be from 0.1 to 3.0, where $M_5$ is the amount of the alkali in relation to the total amount of the reaction liquid, and $M_3$ is the amount of the cationic polymer in relation to the total amount of the reaction liquid. The upper limit to the ratio between amounts ($M_5/M_3$) is preferably 2.0 or less, more preferably 1.5 or less, even more preferably 1.0 or less, particularly preferably 0.8 or less, more particularly preferably 0.6 or less. The lower limit to the ratio between amounts ($M_5/M_3$) is preferably 0.2 or greater, more preferably 0.3 or greater. When the ratio between amounts ($M_5/M_3$) is in these ranges, rub fastness and the reduction of pitting corrosion can be good in a balanced manner.

1.8 Organic Solvent

The reaction liquid according to this embodiment for pigment printing may contain an organic solvent other than polyhydric alcohols as described above. Examples of such organic solvents include alcohols, alkylene glycol ethers, esters, cyclic esters, and nitrogen-containing solvents. Examples of nitrogen-containing solvents include cyclic amides and acyclic amides. Examples of acyclic amides include alkoxyalkylamides.

Examples of alcohols include compounds in which one hydrogen atom in an alkane has been replaced with a hydroxyl group. The alkane may be linear-chain or may be branched. Examples of alcohols include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Alkylene glycol ethers are also referred to as penetrating solvents because they are superior in penetrating properties. The alkylene glycol ethers include any monoether or diether of an alkylene glycol, and alkyl ethers are preferred. Specific examples include alkylene glycol monoalkyl ethers, such as ethylene glycol monomethyl ether, ethylene glycol monoethyl ether, ethylene glycol monoisopropyl ether, ethylene glycol monoisobutyl ether, diethylene glycol monomethyl ether, diethylene glycol monoethyl ether, diethylene glycol monoisobutyl ether, triethylene glycol monomethyl ether, triethylene glycol monoethyl ether, triethylene glycol monoisobutyl ether (BTG; normal boiling point, 278° C.) tetraethylene glycol monomethyl ether, tetraethylene glycol monoethyl ether, tetraethylene glycol monoisobutyl ether, propylene glycol monomethyl ether, propylene glycol monoethyl ether, propylene glycol monopropyl ether, propylene glycol monoisobutyl ether, dipropylene glycol monomethyl ether, dipropylene glycol monoethyl ether, dipropylene glycol monopropyl ether, dipropylene glycol monoisobutyl ether, and tripropylene glycol monoisobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

When a glycol ether is used, the number of carbon atoms thereof is preferably 12 or fewer, preferably 8 or fewer, preferably 6 or fewer. The lower limit is preferably 2 or more, more preferably 3 or more, even more preferably 5 or more. The number of carbon atoms is the number of carbon atoms in the molecule.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds derived from them by replacing a hydrogen or hydrogens in the methylene group adjacent to the carbonyl group with a C1 to C4 alkyl group.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

One organic solvent may be used alone, or two or more may be used in combination.

1.9 Surfactant

The reaction liquid according to this embodiment for pigment printing may contain a surfactant. The surfactant can be of any type, but examples include acetylene glycol surfactants, fluorosurfactants, and silicone surfactants. It is preferred that at least one of these be contained, and it is more preferred that an acetylene glycol surfactant, in particular, be contained.

For acetylene glycol surfactants, any of them can be used, but examples include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; Air Products Japan, K.K.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all are trade names; Nissin Chemical Industry Co., Ltd.), and ACETYLENOL E00, E00P, E40, and E100 (all are trade names; Kawaken Fine Chemicals Co., Ltd.).

For silicone surfactants, any of them can be used, but a preferred example is a polysiloxane compound. The polysiloxane compound can be of any type, but an example is a polyether-modified organosiloxane. Examples of commercially available polyether-modified organosiloxanes include BYK-306, BYK-307, BYK-333, BYK-341, BYK-345, BYK-346, and BYK-348 (trade names, BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.).

For fluorosurfactants, it is preferred to use a fluorine-modified polymer. A specific example is BYK-340 (trade name, BYK Japan KK).

When a surfactant is contained, its amount is preferably 0.1% by mass or more and 5.0% by mass or less, preferably 0.3% by mass or more and 3.0% by mass or less, more preferably 0.5% by mass or more and 1.5% by mass or less of the total amount of the reaction liquid.

1.10 Metal Chelator

The reaction liquid according to this embodiment for pigment printing may contain a metal chelator. Metal chelators are able to remove predetermined ions in the reaction liquid.

Examples of metal chelators include ethylenediaminetetraacetic acid and its salts, such as EDTA, EDTA-2Na (ethylenediaminetetraacetic acid dihydrogen disodium salt), EDTA-3Na (ethylenediaminetetraacetic acid monohydrogen trisodium salt), EDTA-4Na (ethylenediaminetetraacetic acid tetrasodium salt), and EDTA-3K (ethylenediaminetetraacetic acid monohydrogen tripotassium salt), diethylenetriaminepentaacetic acid and its salts, such as DTPA, DTPA-2Na (diethylenetriaminepentaacetic acid disodium salt), and DTPA-5Na (diethylenetriaminepentaacetic acid pentasodium salt), nitrilotriacetic acid and its salts, such as NTA, NTA-2Na (nitrilotriacetic acid disodium salt), and NTA-3Na (nitrilotriacetic acid trisodium salt), ethylenediamine-N,N'-disuccinic acid and its salts, 3-hydroxy-2,2'-iminodisuccinic acid and its salts, L-aspartic acid-N,N'-diacetic acid and its salts, and N-(2-hydroxyethyl)iminodiacetic acid and its salts.

Examples of metal chelators other than acetic acid analogues include ethylenediamine tetramethylene phosphonic acid and its salts, ethylenediamine tetrametaphosphoric acid and its salts, ethylenediamine pyrophosphoric acid and its salts, and ethylenediamine metaphosphoric acid and its salts.

One metal chelator may be used alone, or two or more may be used in combination.

When a metal chelator is contained, its amount can be, for example, 0.005% by mass or more and 0.1% by mass or less, preferably 0.01% by mass or more and 0.05% by mass or less, of the total amount of the reaction liquid.

1.11 Antimicrobial

The reaction liquid according to this embodiment for pigment printing may contain an antimicrobial. Examples of antimicrobials include sodium benzoate, sodium pentachlorophenate, sodium 2-pyridinethiol-1-oxide, sodium sorbate, sodium dehydroacetate, PROXEL CRL, PROXEL BDN, PROXEL GXL, PROXEL XL-2, PROXEL IB, and PROXEL TN (all available from Lonza Japan K.K., trade names), and 4-chloro-3-methylphenol (e.g., Bayer's Preventol CMK).

When an antimicrobial is contained, its amount can be, for example, 0.05% by mass or more and 1.0% by mass or less, preferably 0.1% by mass or more and 0.5% by mass or less, of the total amount of the reaction liquid.

1.12 Other Ingredients

The reaction liquid according to this embodiment for pigment printing may optionally contain, for example, additives such as a softening agent, a dissolution aid, a viscosity modifier, an ultraviolet absorber, an antioxidant, and an anticorrosive as ingredients other than those described above.

1.13 Method for Producing and Characteristics of the Reaction Liquid for Pigment Printing The reaction liquid according to this embodiment for pigment printing is obtained by mixing the above-described ingredients in any order and optionally removing impurities, for example by filtration. As for the method for mixing the ingredients, a method is suitable for use in which the materials are in order added to a container equipped with a stirring device, such as a mechanical stirrer or magnetic stirrer, and mixed together by stirring.

For the reaction liquid according to this embodiment for pigment printing, it is preferred that its surface tension at 20° C. be from 20 to 40 mN/m, more preferably from 22 to 35 mN/m, even more preferably from 25 to 30 mN/m for reliability in ejection by ink jet technology. In particular, when the surface tension at 20° C. of the reaction liquid for pigment printing is from 25 to 30 mN/m, the formation of mist tends to be reduced. The adhesion of the reaction liquid near the nozzle surface of the head, therefore, tends to be reduced, and the impact of pitting corrosion tends to be even smaller.

For reliability in ejection by ink jet technology, the viscosity at 20° C. of the reaction liquid for pigment printing is preferably from 2 to 10 mPa·s, more preferably from 2.5 to 8 mPa·s, even more preferably from 3 to 6 mPa·s, particularly preferably from 3.5 to 5 mPa·s. A surface tension and a viscosity in these ranges can be achieved simply by accordingly adjusting parameters such as the types of the polyhydric alcohols and surfactant described above and the amounts of them and water.

The surface tension can be a value measured by the Wilhelmy method. In the measurement of the surface tension, a surface tensiometer, such as Kyowa Interface Science's CBVP-7, can be used. The viscosity can be measured at 20° C. using a viscoelasticity tester, such as Physica's MCR-300, by increasing the shear rate from 10 [s$^{-1}$] to 1000 [s$^{-1}$] and reading the viscosity when the shear rate is 200 [s$^{-1}$].

The pH at 20° C. of the reaction liquid according to this embodiment for pigment printing is preferably from 5.0 to 10.0, more preferably from 6.0 to 9.5, even more preferably from 6.5 to 9.0, particularly preferably from 7.0 to 8.5, more particularly preferably from 7.5 to 8.0. When the pH of the reaction liquid is in these ranges, pitting corrosion tends to be reduced well, and the degradation of the cationic polymer tends to be further reduced at the same time. Even after prolonged storage of the reaction liquid, therefore, it tends to be possible to impart water resistance to the fabric water resistance and achieve better rub fastness (wet rub fastness in particular), and pitting corrosion on metal components, such as a recording head, also tends to be reduced.

2. INK SET

An ink set according to an embodiment of the present disclosure includes a textile printing ink jet ink composition containing a pigment, resin particles, and water and the above reaction liquid for pigment printing.

With the ink set according to this embodiment, good color strength and good rub fastness are combined with reduced pitting corrosion on metal components, such as a recording head, because the above reaction liquid for pigment printing is included.

It should be noted that in an ink set herein is an ink-reaction liquid set that is a combination of at least a textile printing ink jet ink composition and a reaction liquid for pigment printing. The ink set may include one textile printing ink jet ink composition alone or may include two or more in combination. The same is true for the reaction liquid for pigment printing included in the ink set.

2.1 Reaction Liquid for Pigment Printing

The ink set according to this embodiment includes the above reaction liquid for pigment printing. The reaction liquid for pigment printing is not described because it is as described above.

2.2 Textile Printing Ink Jet Ink Composition

The ink set according to this embodiment includes a textile printing ink jet ink composition containing a pigment, resin particles, and water.

The individual ingredients contained in the textile printing ink jet ink composition included in the ink set according to this embodiment will now be described. It should be understood that for the textile printing ink jet ink composition, its ingredients can be prepared independently of the reaction liquid for pigment printing described above.

In the following description, a "textile printing ink jet ink composition" may be referred to as an "ink jet ink composition," "ink composition," or "ink."

2.2.1 Pigment

The textile printing ink jet ink composition included in the ink set according to this embodiment contains a pigment. The pigment can be, for example, an inorganic pigment or organic pigment. Pigments are a type of colorant. Examples of colorants include pigments and dyes.

Any type of inorganic pigment can be used, but examples include carbon blacks, such as furnace black, lamp black, acetylene black, and channel black; and white inorganic oxides, such as iron oxide, titanium oxide, zinc oxide, and silica.

Examples of carbon blacks include C.I. (Colour Index Generic Name) Pigment Black 1, 7, and 11. Commercially available carbon blacks may also be used, and examples include Mitsubishi Chemical's No. 2300, No. 900, MCF88, No. 33, No. 40, No. 45, No. 52, MA7, MA8, MA100, No. 2200B, etc., Columbia Carbon's Raven® 5750, 5250, 5000, 3500, 1255, 700, etc., CABOT's Regal® 400R, 330R, and 660R, Mogul® L, Monarch® 700, 800, 880, 900, 1000, 1100, 1300, and 1400, etc., and Degussa's Color Black FW1, FW2, FW2V, FW18, FW200, 5150, 5160, and 5170, Printex® 35, U, V, and 140U, Special Black 6, 5, 4A, and 4, etc.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments include the following.

For cyan pigments, examples include C.I. Pigment Blue 1, 2, 3, 15:3, 15:4, 15:34, 16, 22, 60, etc.; and C.I. Vat Blue 4, 60, etc. A preferred example is one or a mixture of two or more selected from the group consisting of C.I. Pigment Blue 15:3, 15:4, and 60.

For magenta pigments, examples include C.I. Pigment Red 5, 7, 12, 48 (Ca), 48 (Mn), 57 (Ca), 57:1, 112, 122, 123, 168, 184, and 202 and C.I. Pigment Violet 19. A preferred example is one or a mixture of two or more selected from the group consisting of C.I. Pigment Red 122, 202, and 209 and C.I. Pigment Violet 19.

For yellow pigments, examples include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. A preferred example is one or a mixture of two or more selected from the group consisting of C.I. Pigment Yellow 74, 109, 110, 128, 138, 150, and 180.

Pigments in other colors can also be used. Examples include orange pigments and green pigments.

One pigment may be used alone, or two or more may be used in combination.

Preferably, the pigment is subjected to surface treatment or formulated with, for example, a dispersant for increased dispersibility in the ink composition.

Surface treatment of a pigment refers to a treatment in which a carbonyl, carboxyl, aldehyde, hydroxyl, sulfone, or ammonium group or a functional group that is their salt, for example, is directly or indirectly coupled to the surface of the pigment through a physical or chemical treatment.

When the ink composition is formulated with a dispersant, it is preferred to use a dispersant having a hydrophobic moiety (hydrophobic group) and a hydrophilic moiety (hydrophilic group) in its molecular structure. Such a dispersant acts to become adsorbed onto the surface of the particles of the pigment with its hydrophobic moiety and orient its hydrophilic moiety toward an aqueous medium in the ink composition. By virtue of this action, the pigment tends to be more stably contained in the ink composition as a dispersed substance.

Such a dispersant can be of any type, but examples include acrylic resins, styrene-acrylic resins, such as styrene-(meth)acrylic acid copolymers and styrene-(meth) acrylic acid-(meth)acrylate copolymers, and styrene-maleic acid resins and their salts, as well as formaldehyde condensates of aromatic sulfonates, and one or more selected form the group of these can be used. The dispersant may be a commercially available one.

Alternatively, a method may be used in which dispersibility is imparted to the particles of the pigment by coating them, for example with a resin. The method for coating the pigment particles can be, for example, separation using an acid, phase inversion emulsification, or mini-emulsion polymerization.

The amount of the pigment can be adjusted as appropriate according to the purpose of use, but preferably is 0.1% by mass or more and 17.0% by mass or less, more preferably 0.2% by mass or more and 15.0% by mass or less, even more preferably 1.0% by mass or more and 10.0% by mass or less, particularly preferably 2.0% by mass or more and 5.0% by mass or less of the total amount of the ink composition. When the amount of the pigment is in these ranges, ejection performance in ejection by ink jet technology tends to be further improved.

The ink composition may contain a dye as a colorant other than pigments as described above. Examples of dyes include acid dyes, reactive dyes, and direct dyes.

2.2.2 Resin Particles

The textile printing ink jet ink composition included in the ink set according to this embodiment contains resin particles. Resin particles are particles containing a resin and are also referred to as "a dispersed resin" or "a resin emulsion."

Examples of resins include urethane resins, polycarbonate resins, (meth)acrylic resins, styrene resins, silicone resins, styrene acrylic resins, fluorene resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. One such resin may be used alone, or two or more may be used in combination.

Of these, urethane resins, polycarbonate resins, (meth)acrylic resins, and styrene resins are particularly preferred for the resin particles, urethane resins and (meth)acrylic resins are more preferred, and urethane resins are even more preferred. In particular, with the resin particles being of a urethane resin, the cationic polymer contained in the reaction liquid described above and the urethane resin can react together, and color strength, rub fastness, bleeding, etc., may be better.

A urethane resin is a resin having a urethane linkage in its molecule. The urethane resin is preferably an anionic urethane resin having a carboxy, sulfo, hydroxy, or other anionic functional group for storage stability of the ink.

Examples of urethane resins include polyether urethane resins, which contain, besides a urethane linkage, an ether linkage in their backbone, polyester urethane resins, which contain an ester linkage in their backbone, and polycarbonate urethane resins, which contain a carbonate linkage in their backbone. Multiple ones of such urethane resins can be used in combination.

Examples of commercially available urethane resins include ETERNACOLL UW-1501F, UW-1527F, and UW-5002 (trade names of Ube Industries products), Takelac WS-5000, W-6061, W-6110, WS-5984, and WS-5100 (trade names of Mitsui Chemicals products), PERMARIN UA-150 and UA-200 and UCOAT UX-390 (trade names of Sanyo Chemical Industries products), and HYDRAN WLS-210 (trade name of a DIC product).

A polycarbonate resin is a resin having a polycarbonate linkage in its molecule. When no urethane resin is used, it is preferred to use a polycarbonate resin instead.

Commercially available (meth)acrylic resins include Mowinyl 966A and 6760 (trade names of the Nippon Synthetic Chemical products), which are acrylic resins.

(Meth)acrylic resin refers to a resin having a (meth)acrylic backbone. Any type of (meth)acrylic resin can be used, but examples include polymers of (meth)acrylic monomers, such as (meth)acrylic acid and (meth)acrylates, and copolymers of a (meth)acrylic monomer and an extra monomer. An example of an extra monomer is a vinyl monomer, such as styrene. As used herein, "(meth)acrylic" represents acrylic or methacrylic, and "(meth)acrylate" represents an acrylate or methacrylate.

Commercially available silicone resins include POLON-MF014, POLON-MF-18T, POLON-MF-33, and KM-2002-T (trade names of Shin-Etsu Silicone products) and WACKER FINISH WR1100 and NP2406 and POWERSOFT FE 55 and TS2406 (trade names of Asahi Kasei products).

The acid value of the resin contained in the resin particles can be any value, but preferably is from 1 to 300 KOH mg/g, more preferably from 10 to 200 KOH mg/g, even more preferably from 20 to 100 KOH mg/g.

The amount of the resin particles is preferably 1.0% by mass or more, more preferably from 2.0% to 20% by mass, even more preferably from 3.0% to 10% by mass on a solids basis of the total amount of the ink composition. With an amount of the resin particles in these ranges, a recorded article superior in color strength and rub fastness tends to be obtained.

2.2.3 Water

The textile printing ink jet ink composition included in the ink set according to this embodiment contains water. Types of water that can be used as such water are the same as for the water contained in the reaction liquid for pigment printing described above. The amount of the water can also be as described above.

2.2.4 Organic Solvents

The textile printing ink jet ink composition included in the ink set according to this embodiment may contain, as organic solvents, a polyhydric alcohol and an organic solvent other than polyhydric alcohols. Types of organic solvents that can be used as such organic solvents are the same as for the organic solvents that can be contained in the reaction liquid for pigment printing described above.

The amount of polyhydric alcohols having a normal boiling point of 250° C. or above can be any amount, but preferably is 5.0% by mass or more, more preferably 10% by mass or more, even more preferably 12% by mass or more, still more preferably 15% by mass or more of the total amount of the ink composition. The upper limit can be any value, but preferably is 30% by mass or less, more preferably 27% by mass or less, even more preferably 25% by mass or less, still more preferably 22% by mass or less, particularly preferably 20% by mass or less. When the amount of polyhydric alcohols having a normal boiling point of 250° C. or above is in these ranges, the balance between moisture retention and dryability tends to be excellent, and both intermittent printing stability and rub fastness tend to be good.

As for organic solvents other than polyhydric alcohols, alkylene glycol ethers are preferred, and alkylene glycol monoalkyl ethers are more preferred. The amount of organic solvents other than polyhydric alcohols can be any amount, but preferably is from 0.1% to 5% by mass, more preferably from 0.3% to 3% by mass, even more preferably from 0.5% to 1.5% by mass of the total amount of the ink composition.

2.2.5 Surfactant

The textile printing ink jet ink composition included in the ink set according to this embodiment may contain a surfactant. Types of surfactants that can be used as such a surfactant are the same as for the surfactant that can be contained in the reaction liquid for pigment printing described above. The amount of the surfactant can also be as described.

2.2.6 pH-Adjusting Agent

The textile printing ink jet ink composition included in the ink set according to this embodiment may contain a pH-adjusting agent. The pH-adjusting agent can be of any type, but an example is an appropriate combination of an acid, a base, a weak acid, and a weak base. Examples of acids and bases used in such a combination include sulfuric acid, hydrochloric acid, nitric acid, etc., for inorganic acids and lithium hydroxide, sodium hydroxide, potassium hydroxide, potassium dihydrogen phosphate, disodium hydrogen phosphate, potassium carbonate, sodium carbonate, sodium bicarbonate, ammonia, etc., for inorganic bases. For organic bases, examples include triethanolamine, diethanolamine, monoethanolamine, tripropanolamine, triisopropanolamine, diisopropanolamine, and trishydroxymethylaminomethane (THAM), and for organic acids, acids that may be used include adipic acid, citric acid, succinic acid, and lactic acid, Good's buffers, such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), colamine hydrochloride, N-tris(hydroxymethyl)methyl-2-aminoethanesulfonic acid (TES), acetamidoglycine, tricine, glycinamide, and bicine, phosphate buffers, citrate buffers, and tris buffers. Alternatively, the alkali contained in the reaction liquid for pigment printing described above may be used as a pH-adjusting agent.

The ink composition may be made with one pH-adjusting agent alone or may be made with two or more in combination. The total amount of pH-adjusting agents, when used, relative to the total mass of the ink composition is, for example, 0.05% by mass or more and 3.0% by mass or less, more preferably 0.1% by mass or more and 1.0% by mass or less.

2.2.7 Other Ingredients

The textile printing ink jet ink composition included in the ink set according to this embodiment may optionally contain, as ingredients other than those described above, additives such as a lubricant, a softening agent, a dissolution aid, a viscosity modifier, an antioxidant, an antimicrobial, such as PROXEL XL2 (trade name of an Arch Chemicals product), an anticorrosive, and a metal chelator (e.g., sodium ethylenediaminetetraacetate) for trapping metal ions that would affect dispersion.

2.2.8 Production and Characteristics of the Ink Composition

The textile printing ink jet ink composition included in the ink set according to this embodiment is obtained by mixing the above-described ingredients in any order and optionally removing impurities, for example by filtration. As for the method for mixing the ingredients, a method is suitable for use in which the materials are in order added to a container equipped with a stirring device, such as a mechanical stirrer or magnetic stirrer, and mixed together by stirring.

For the textile printing ink jet ink composition included in the ink set according to this embodiment, it is preferred that its surface tension at 20° C. be from 20 to 40 mN/m, more preferably from 22 to 35 mN/m, for reliability in ejection by ink jet technology. For the same reason, the viscosity at 20° C. of the ink composition is preferably from 1.5 to 10 mPa·s, more preferably 8 mPa·s or less, even more preferably from 2 to 8 mPa·s. A surface tension and a viscosity in these ranges can be achieved simply by accordingly adjusting parameters such as the types of the organic solvents and surfactant described above and the amounts of them and water.

3. RECORDING METHOD

A recording method according to an embodiment of the present disclosure includes an ink attachment step, in which an ink composition is attached to fabric by ink jet technology, and a reaction liquid attachment step, in which the reaction liquid for pigment printing described above is attached to the fabric by ink jet technology.

With the recording method according to this embodiment, good color strength and good rub fastness are combined with reduced pitting corrosion on metal components, such as a recording head, because the above reaction liquid for pigment printing is included.

The recording method according to this embodiment is applied to fabric. The fabric can be composed of any material, and examples include natural fibers, such as cotton, hemp, wool, and silk, synthetic fibers, such as polypropylene, polyester, acetate, triacetate, polyamide, and polyurethane, and biodegradable fibers, such as polylactic acid. A blend of these fibers may also be used.

The fabric preferably has hydroxyl groups. Examples of such fabrics include fabrics containing cellulose, such as cotton and hemp, and fabrics containing polyurethane. When the fabric has hydroxyl groups, crosslinking reactions can occur between the cationic polymer contained in the reaction liquid described above and hydroxyl groups on the fabric. In that case thickening and aggregation may lead to the advantage of improved color strength, and improved adhesion between the fabric and the ink layer may lead to the advantage of improved rub fastness.

The fabric may be any form of the above fibers, such as woven, knitted, or nonwoven fabric. The weight of the fabric used in this embodiment can also be any value; it may be 1.0 oz or more and 10.0 oz or less, preferably is 2.0 oz or more and 9.0 oz or less, more preferably 3.0 oz or more and 8.0 oz or less, even more preferably 4.0 oz or more and 7.0 oz or less. When the weight of the fabric is in such a range, good recording can be performed. The recording method according to this embodiment is applicable to multiple types of fabrics with different weights and allows for good printing.

In this embodiment, examples of forms of the fabric include cloth, clothing, and other fashion items. The cloth includes, for example, woven, knitted, and nonwoven fabrics. The clothing and other fashion items include not only sewn T-shirts, handkerchiefs, scarves, towels, tote bags, and cloth bags and furnishings, such as curtains, sheets, bedspreads, and wallpapers, but also cut and uncut cloth as unsewn pieces. Examples of their formats include a long piece of fabric made into a roll, fabric cut to a predetermined size, and fabric in product form.

The fabric may be cotton fabric colored beforehand with a dye. Examples of dyes with which the fabric is colored beforehand include water-soluble dyes, such as acid dyes and basic dyes, disperse dyes, which are used in combination with a dispersant, and reactive dyes. When cotton fabric is used, it is preferred to use a reactive dye, which is suitable for the dyeing of cotton.

The individual steps that the recording method according to this embodiment has will now be described.

3.1 Ink Attachment Step

The recording method according to this embodiment includes an ink attachment step, in which an ink composition is attached to fabric by ink jet technology.

For use as the ink composition, the textile printing ink jet ink composition described above is preferred.

Ink jet technology is a recording method in which droplets, for example of ink, are ejected from nozzles of an ink jet head, for example of an ink jet recording apparatus, and attached to a recording medium.

The amount of the ink composition attached is preferably from 10 to 21 $mg/inch^2$, more preferably from 12 to 20 $mg/inch^2$, even more preferably from 14 to 19 $mg/inch^2$, particularly preferably from 15 to 18 $mg/inch^2$ per unit area of the recording region of the fabric.

3.1.1 Interval Between Steps

In the recording method according to this embodiment, the time lag between the ink attachment step and the reaction liquid attachment step, described later, is preferably 5 seconds or less. When the ink attachment and reaction liquid attachment steps are performed with such a time lag, the recording method can be wet-on-wet, in which before the drying of first droplets, which are attached first, second droplets, which are applied later, are attached. When the first droplets are of the ink composition, the second droplets are of the reaction liquid, and when the first droplets are of the reaction liquid, the second droplets are of the ink composition. The wet-on-wet technique has advantages in terms of reduced apparatus size and enhanced speed, but also has the disadvantage that bleeding, color strength, and rub fastness are likely to be inferior. With the recording method according to this embodiment, color strength and rub fastness are excellent, and bleeding is also reduced, even with such a wet-on-wet technique. In addition, in the recording method according to this embodiment, the reaction between the ink and the reaction liquid tends to proceed more smoothly, and color strength and rub fastness tend to be better, when the time lag is 5 seconds or less.

As used herein, the time lag between the ink attachment and reaction liquid attachment steps refers to the time lag from the last ejection of the reaction liquid to the first ejection of the ink composition.

In the description below, furthermore, "alternate attachment" refers to attaching the ink composition and the reaction liquid to a certain scan area of the fabric through a certain main scan (movement of an ink jet head in the direction perpendicular to the direction of transport of the fabric) to form a layer containing the ink composition and the reaction liquid. "Advance attachment" refers to attaching the ink composition and the reaction liquid to a certain scan area of the fabric through different main scans to form a stack of a layer containing the reaction liquid and a layer containing the ink composition. In particular, the case in which the layer containing the reaction liquid is formed first, and then the layer containing the ink composition is formed over it is referred to as "reaction liquid-first attachment."

The time lag between the ink attachment and reaction liquid attachment steps is preferably 1 second or less, more preferably 0.8 seconds or less, even more preferably 0.6 seconds or less, particularly preferably 0.4 seconds or less in the case of alternate attachment. The lower limit can be any value, but preferably is 0.1 seconds or more, more preferably 0.2 seconds or more. In the case of alternate attachment, the time lag between the ink attachment and reaction liquid attachment steps is particularly preferably 0.3 seconds. With such a time lag, the reaction between the ink and the reaction liquid tends to proceed more smoothly, and color strength and rub fastness tend to be better.

The time lag between the ink attachment and reaction liquid attachment steps is preferably 4.9 seconds or less, more preferably 4.8 seconds or less, even more preferably 4.7 seconds or less, particularly preferably 4.6 seconds or less in the case of reaction liquid-first attachment. The lower limit can be any value, but preferably is 3.0 seconds or more, more preferably 3.5 seconds or more, even more preferably 4.0 seconds or more, particularly preferably 4.2 seconds or more, more particularly preferably 4.4 seconds or more. In the case of reaction liquid-first attachment, the time lag between the ink attachment and reaction liquid attachment steps is particularly preferably 4.5 seconds. With such a time lag, the reaction between the ink and the reaction liquid tends to proceed more smoothly, and color strength and rub fastness tend to be better.

3.1.2 Attachment Techniques
3.1.2.1 Alternate Attachment

In the recording method according to this embodiment, the reaction liquid attachment step, described later, and the ink attachment step are performed by ink jet technology, and the ink jet technology is preferably one in which a main scan, in which recording is performed by moving an ink jet head in the direction perpendicular to the direction of transport of the fabric, is carried out multiple times and one in which the reaction liquid and the ink composition are attached to a certain scan area of the fabric through a certain main scan and in which the certain scan area is subjected to the certain main scan multiple times.

With such an arrangement, alternate attachment is possible. More specifically, a layer containing the ink composition and the reaction liquid can be attached to a given region on the fabric through a given main scan, and then, to cover this layer, a layer containing the ink composition and the reaction liquid can be attached through another main scan. This leads to alternate layering of the reaction liquid and the ink composition into a stack (layered like a mille-feuille), allowing their ingredients to mix better. The reaction, therefore, tends to proceed more smoothly, and color strength, rub fastness, and the reduction of bleeding tend to be better.

Subjecting a certain scan area to a certain main scan multiple times means that an ink jet head that attaches the ink composition and the reaction liquid passes over a certain region of the fabric multiple times. With increasing number of scans, the ink and the reaction liquid tend to be attached to the desired region at multiple separate times (in multiple passes), and the image quality of the resulting recorded article tends to be further improved.

Incidentally, in the recording of an image, for example, in any given region, the number of times that the ink jet head passes over that region is also referred to as "passes." For example, when a main scan in which the ink composition and the reaction liquid are attached is carried out four times over a certain region, the number of passes is referred to as, for example, four passes. For example, when, in FIG. 3, the length of one sub-scan in the sub-scan direction SS is a quarter of the length of the nozzle rows in the sub-scan direction SS, it means that a rectangular scan area having a length of one sub-scan in the sub-scan direction SS and extending in the main scan direction MS is subjected to four scans. The number of scans when viewed in such a manner is referred to as, for example, the scan value or the number of passes. The number of scans is two or more, preferably three or more, more preferably four or more. The number of scans, furthermore, is preferably ten or fewer, more preferably eight or fewer, even more preferably six or fewer, particularly preferably four or fewer. With the recording method according to this embodiment, color strength, rub fastness, and the reduction of bleeding tend to be better even when the number of scans is in these ranges.

In alternate attachment as described above, a layer containing the reaction liquid may be formed through a main scan different from the main scans for the formation of the layers containing the ink composition and the reaction liquid so that a stack of the layers containing the ink composition and the reaction liquid and a layer containing the reaction liquid will be formed. Forming a layer containing the reaction liquid in such a manner can lead to even better color strength and rub fastness. The formation of the layer containing the reaction liquid may be performed before the formation of the layers containing the ink composition and the reaction liquid or may be performed after it, but preferably is performed before the formation of the layers containing the ink composition and the reaction liquid.

3.1.2.2 Advance Attachment

In the recording method according to this embodiment, the reaction liquid attachment step, described later, and the ink attachment step are performed by ink jet technology, and the ink jet technology may be one in which a main scan, in which recording is performed by moving an ink jet head in the direction perpendicular to the direction of transport of the fabric, is carried out multiple times and one in which the reaction liquid and the ink composition are attached to a certain scan area of the fabric through different main scans.

With such an arrangement, advance attachment is possible; a stack of a layer containing the reaction liquid and a layer containing the ink composition can be formed. In the recording method according to this embodiment, color strength, rub fastness, and the reduction of bleeding are good even with such advance attachment.

In advance attachment, the ink composition and the reaction liquid can be attached in any order as long as they are attached through different main scans. Reaction liquid-first attachment, however, is more preferred, in which the reaction liquid is attached first, and the ink composition is attached over it.

In advance attachment, the different main scans in which the ink composition and the reaction liquid are attached to the certain scan area may each be carried out multiple times. For example, it is possible that the reaction liquid is attached with four passes, and then the ink composition is attached with four passes. The number of passes in advance attachment may be set independently for each of the ink composition and the reaction liquid.

3.1.2.3 Other Attachment Techniques

In the alternate attachment and advance attachment techniques described above, a serial ink jet head is used. Alternatively, a line ink jet head may be used to perform the ink attachment and reaction liquid attachment steps.

More specifically, in the recording method according to this embodiment, the reaction liquid attachment step, described later, and the ink attachment step are performed by ink jet technology, and the ink jet technology may be one in which an ink jet head having a length equal to or longer than the recording width of the fabric (line head) is used and in which the fabric is subjected to a scan with this ink jet head once while being transported.

Such a line recording method allows the ink composition and the reaction liquid to be ejected and attached to the fabric while the positions of the line head and the fabric are relatively moved in the scan direction, or the direction that crosses the direction along the width of the fabric (longitudinal direction with respect to the fabric or direction of transport of the fabric).

3.2 Reaction Liquid Attachment Step

The recording method according to this embodiment includes a reaction liquid attachment step, in which the reaction liquid for pigment printing described above is attached to the fabric by ink jet technology.

The amount of reaction liquid attached is preferably from 10 to 21 mg/inch$^2$, more preferably from 12 to 20 mg/inch$^2$, even more preferably from 14 to 19 mg/inch$^2$, particularly preferably from 15 to 18 mg/inch$^2$ per unit area of the recording region of the fabric.

3.2.1 Interval Between Steps

As stated above, in the recording method according to this embodiment, the time lag between the ink attachment step, described above, and the reaction liquid attachment step is preferably 5 seconds or less. Preferred time lags in the cases of alternate attachment and reaction liquid-first attachment are not described; they are the same as described above.

3.2.2 Attachment Techniques

As stated, in the recording method according to this embodiment, alternate attachment is preferred. Advance attachment is also allowed, and a line ink jet head may be used to carry out the ink attachment and reaction liquid attachment steps.

3.3 Other Steps

The recording method according to this embodiment may include a step of heating the ink, for example, attached to the fabric after the ink attachment and reaction liquid attachment steps described above. Any heating method can be used, but examples include heat pressing, atmospheric-pressure steaming, high-pressure steaming, and thermofixation. The heat source for the heating can be of any kind, but for example, sources such as an infrared lamp can be used. The heating temperature is preferably a temperature at which the resin particles in the ink are fused together and at which the medium, such as water, volatilizes. For example, the heating temperature is preferably approximately 100° C. or above and approximately 200° C. or below, more preferably 170° C. or below, even more preferably 160° C. or below. In this context, the heating temperature in the step of heating refers to the surface temperature of the image, for example, formed on the fabric. The duration of heating can be any length, but for example is 30 seconds or more and 20 minutes or less.

After the step of heating, a step in which the printed fabric is washed with water and dried may be included. In the water washing, ingredients, for example in the ink, not fixed onto the fabric may optionally be washed away, for example using hot soapy water, as soaping treatment.

3.4 Ink Jet Textile Printing Apparatus

An example of an ink jet textile printing apparatus including an ink jet head applicable to the recording method according to this embodiment will be described with reference to FIG. 1.

The ink jet textile printing apparatus used in the following description is a serial printer, which has an ink jet head for recording on a carriage that moves in a predetermined direction. As the carriage moves, the ink jet head moves to eject droplets onto fabric. An ink jet textile printing apparatus applicable to the recording method according to this embodiment does not need to be a serial printer but may be a line printer. A line printer is a printer having an ink jet head formed broader than the width of the fabric. The ink jet head ejects droplets onto the fabric without moving.

An ink jet textile printing apparatus is an apparatus that performs textile printing by striking droplets onto fabric with an ink jet head as a liquid ejector that ejects tiny droplets of at least one ink composition and a reaction liquid. FIG. 1 is a schematic perspective diagram illustrating an ink jet textile printing apparatus used in an embodiment.

As illustrated in FIG. 1, in this embodiment, the printer 1 has an ink jet head 3, a carriage 4, a main scan mechanism 5, a platen roller 6, and a control unit (not illustrated) that controls the overall operation of the printer 1. The ink jet head 3 is mounted on the carriage 4, and liquid cartridges 7a, 7b, 7c, 7d, 7e, and 7f containing ink compositions and a reaction liquid to be supplied to the ink jet head 3 can be attached to and detached from the carriage 4.

The main scan mechanism 5 has a timing belt 8 coupled to the carriage 4, a motor 9 that drives the timing belt 8, and a guide shaft 10. The guide shaft 10 has been installed to extend in the direction in which the carriage 4 travels, or in the main scan direction MS, as a support for the carriage 4. The carriage 4 is driven by the motor 9 via the timing belt 8 and can move back and forth along the guide shaft 10. By virtue of this, the main scan mechanism 5 has the function of moving the carriage 4 back and forth in the main scan direction MS.

The platen roller 6 has the function of transporting the fabric 2 to be printed in the sub-scan direction SS, which is perpendicular to the main scan direction MS described above, or in the direction along the length of the fabric 2. By virtue of this, the fabric 2 is transported in the sub-scan direction SS. The carriage 4, on which the ink jet head 3 is mounted, can move back and forth in the main scan direction MS, which is substantially identical to the direction along the width of the fabric 2, and the ink jet head 3 is configured such that it can move in the main scan and sub-scan directions MS and SS in relation to the fabric 2.

The liquid cartridges 7a, 7b, 7c, 7d, 7e, and 7f are six independent liquid cartridges. Ink compositions and a reaction liquid to be used in the recording method according to this embodiment can be contained in the liquid cartridges 7a, 7b, 7c, 7d, 7e, and 7f. Ink compositions that exhibit the colors of black, cyan, magenta, yellow, white, orange, etc., and a reaction liquid are separately contained in these liquid cartridges and can be used in any combination. The number of liquid cartridges in FIG. 1 is six, but this is not the only possible number. At the bottom of the liquid cartridges 7a, 7b, 7c, 7d, 7e, and 7f, there is an outlet (not illustrated) for supplying the ink composition or reaction liquid contained in the liquid cartridge through to the ink jet head 3.

The ink jet head 3 is means that ejects the ink compositions and reaction liquid supplied from the liquid cartridges 7a, 7b, 7c, 7d, 7e, and 7f onto the fabric 2 through multiple nozzles and attaches them to the fabric 2 under the control of the control unit (not illustrated). The ink jet head 3 has, in its surface facing the fabric 2 to which the ink compositions and reaction liquid are to be attached, multiple nozzles through which the ink compositions and reaction liquid are ejected and attached to the fabric 2. These multiple nozzles are arranged in rows to form nozzle rows, and the nozzle rows are arranged separately from one another corresponding to the ink compositions in different colors and the reaction liquid. The ink compositions in different colors and the reaction liquid are supplied from the liquid cartridges to the ink jet head 3 and ejected as droplets through the nozzles by actuators (not illustrated) placed inside the ink jet head 3. The ejected droplets of the ink compositions and reaction liquid land on the fabric 2, a treatment for attaching them to the fabric 2 is carried out, and the inks form an image, text, a pattern, or colors, for example, in a print region of the fabric 2. Multiple ink jet heads 3 may be mounted on the carriage 4.

The ink jet head 3 in the above example uses piezoelectric elements as the actuators serving as driving means, but this is not the only possible mechanism. For example, it is also allowed to use electromechanical transducers, which displace a diaphragm as an actuator with the use of electrostatic attraction, or electrothermal transducers, which eject the ink composition with the use of bubbles generated by heating.

The ink jet head 3 has a reaction liquid-ejecting nozzle assembly, through which the reaction liquid is ejected, and an ink composition-ejecting nozzle assembly, through which the ink compositions are ejected. Ejecting nozzle assembly means that the nozzle assembly is used for recording in the recording method. An ejecting nozzle assembly is an assembly of nozzles through which ink, for example, can be ejected during a main scan if there is an image to be recorded on the region of the fabric facing this nozzle assembly, and is a nozzle assembly continuous in the sub-scan direction SS. A nozzle assembly that exists but is not used for recording in the recording method, therefore, is not an ejecting nozzle assembly.

Figure 2:
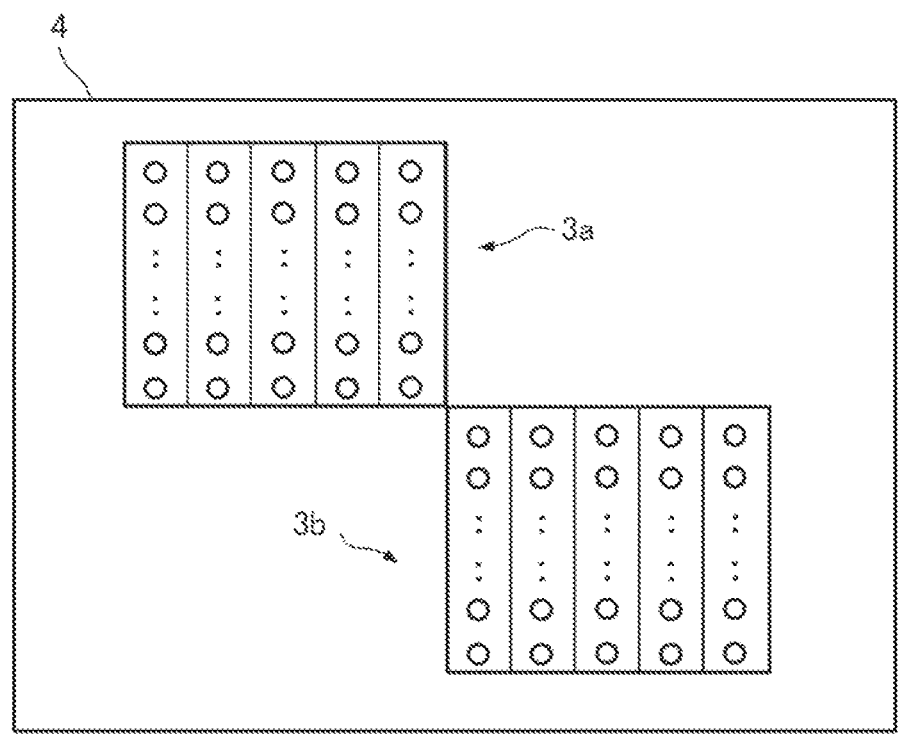
FIG. 2 is a schematic diagram illustrating an example of an arrangement of ink jet heads of an ink jet textile printing apparatus.
Figure 2:
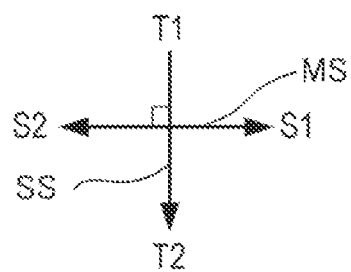
Figure 3:
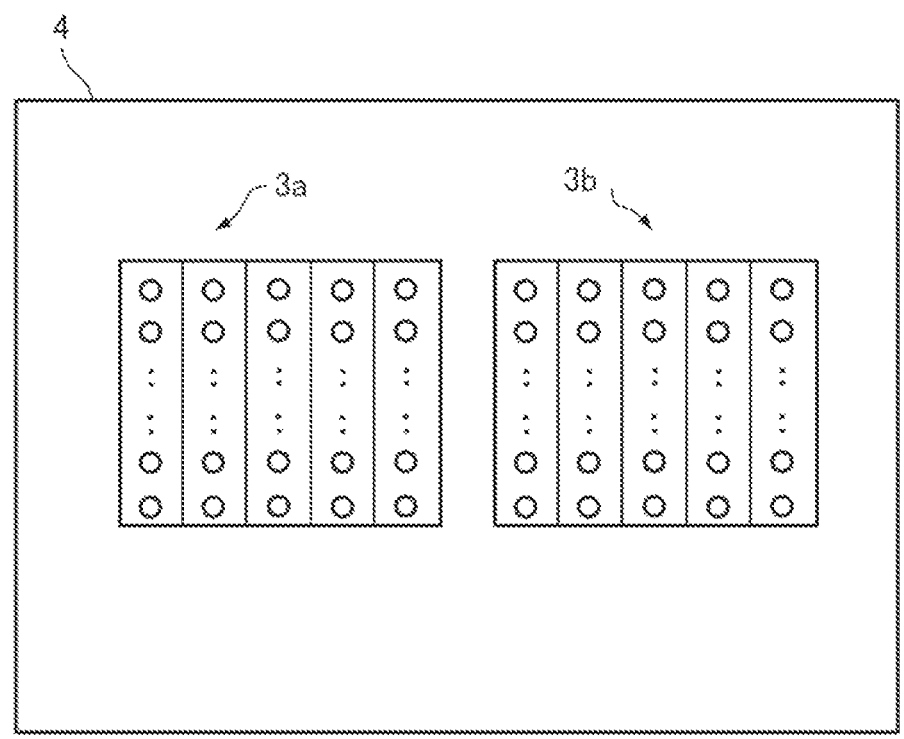
FIG. 3 is a schematic diagram illustrating an example of an arrangement of ink jet heads of an ink jet textile printing apparatus.
Figure 3:
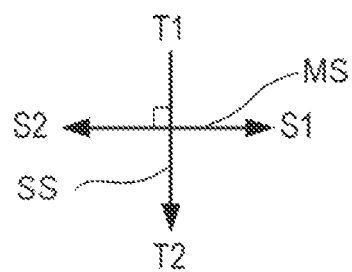
Figure 4:
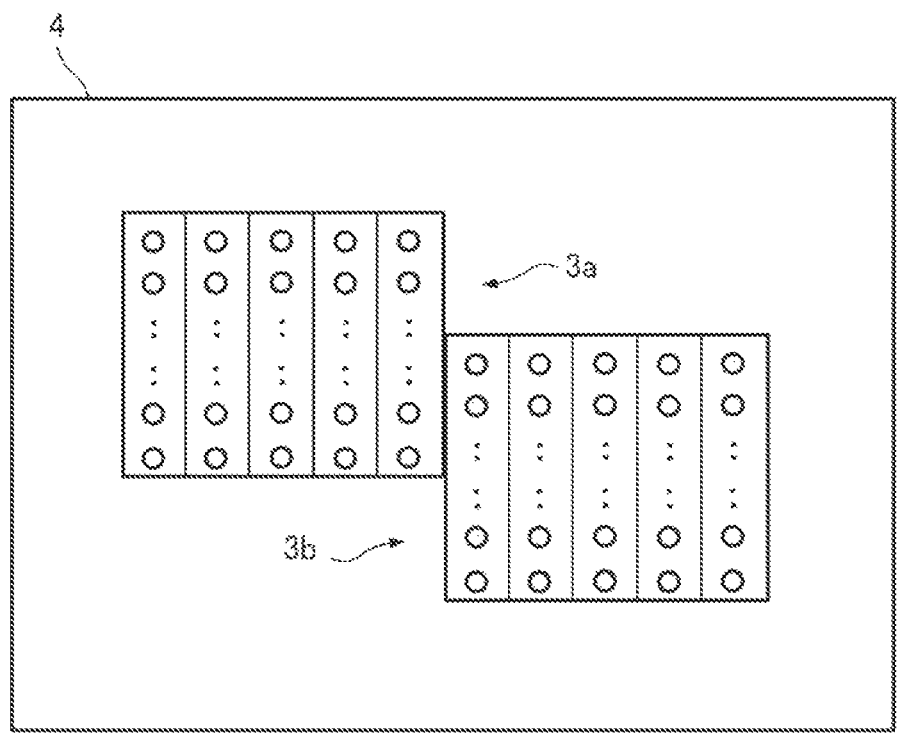
FIG. 4 is a schematic diagram illustrating an example of an arrangement of ink jet heads of an ink jet textile printing apparatus.
Figure 4:
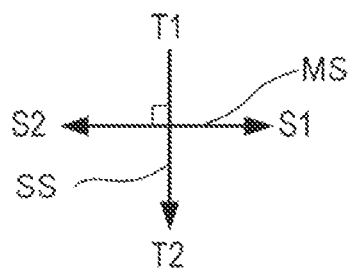

FIGS. 2, 3, and 4 illustrate examples of head arrangements for the ink jet head 3. In FIG. 2, there are an ink jet head 3a and an ink jet head 3b upstream and downstream, respectively, in the direction of transport (the sub-scan direction SS). In FIG. 3, the ink jet head 3a and the ink jet head 3b are at the same position in the sub-scan direction SS, arranged side by side. In FIG. 4, the ink jet head 3a and the ink jet head 3b are positioned upstream and downstream, respectively, in the direction of transport (the sub-scan direction SS), having an overlap with each other.

In the recording method according to this embodiment, the ink jet head 3 is preferably configured to have the reaction liquid nozzle assembly to be used for recording upstream of or to overlap, in the direction of transport of the fabric, the ink composition nozzle assembly to be used for recording. For the same reason, the head that ejects the reaction liquid is preferably at the same position in the direction of transport of the fabric as the head that ejects the ink compositions or upstream of the head that ejects the ink compositions in the direction of transport of the fabric. In such a configuration, the droplets can be attached by alternate attachment or reaction liquid-first attachment. The ingredients in the ink compositions and those in the reaction liquid are thus mixed better, and the reaction proceeds more smoothly. Color strength, rub fastness, and the reduction of bleeding, therefore, tend to be better.

For instance, in the example in FIG. 2, the ink jet head 3a may be chosen as the head that ejects the reaction liquid, and the ink jet head 3b may be chosen as the head that ejects the ink compositions so that the reaction liquid nozzle assembly to be used for recording will be positioned upstream, in the direction of transport of the fabric (the sub-scan direction SS), of the ink composition nozzle assembly to be used for recording. In such a case, the reaction liquid adheres earlier than the ink compositions to the fabric. In other words, reaction liquid-first attachment is possible; a layer containing the reaction liquid can be formed first, and then a layer containing the ink compositions can be formed over it.

For instance, in the example in FIG. 3, the ink jet head 3a may be chosen as the head that ejects the reaction liquid, the ink jet head 3b may be chosen as the head that ejects the ink compositions, and the reaction liquid nozzle assembly to be used for recording and the ink composition nozzle assembly to be used for recording may have an overlap. In that case, alternate attachment is possible. That is, alternate layering of the reaction liquid and the ink compositions (layering like a mille-feuille) is possible.

An "overlap" refers to portions of the ink composition nozzle assembly to be used for recording and the reaction liquid nozzle assembly to be used for recording that are at the same position in the sub-scan direction SS. As a result of this, the ink compositions and the reaction liquid attached to the fabric in the same main scan, overlapping each other.

For instance, in the example in FIG. 4, the ink jet head 3a may be chosen as the head that ejects the reaction liquid, the ink jet head 3b may be chosen as the head that ejects the ink composition, and the reaction liquid nozzle assembly to be used for recording and the ink composition nozzle assembly to be used for recording may have an overlap. In that case, alternate attachment is possible. Alternatively, the ink jet head 3a may be chosen as the head that ejects the reaction liquid, the ink jet head 3b may be chosen as the head that ejects the ink composition, and the reaction liquid nozzle assembly to be used for recording may be positioned upstream, in the direction of transport of the fabric (the sub-scan direction SS), of the ink composition nozzle assembly to be used for recording with no overlap between the reaction liquid nozzle assembly to be used for recording and the ink composition nozzle assembly to be used for recording. In that case, reaction liquid-first attachment is possible.

The printer 1 may include drying means and heating means (both not illustrated). The drying and heating means are means for efficient drying of the reaction liquid and inks attached to the fabric 2. The drying and heating means can be placed anywhere, provided that the fabric 2 can be dried/heated with them. For efficient drying of the reaction liquid and inks attached to the fabric 2, the drying and heating means can be placed at positions at which they face the ink jet head 3, for example in FIG. 1.

Examples of drying means and heating means include a print heater mechanism that heats the fabric 2 by bringing it into contact with a heat source, a mechanism that emits, for example, infrared radiation or microwaves, which are electromagnetic waves having a peak wavelength around 2,450 MHz, and a dryer mechanism, which, for example, blows warm air. The heating of the fabric 2 is performed before the droplets ejected through the nozzles in the ink jet head 3 adhere to the fabric 2 or at the time of the adhesion. The control of parameters for heating, such as the time when the heating is performed, the heating temperature, and the duration of heating, is conducted by the control unit.

Alternatively, the drying and heating means may be placed downstream in the direction of transport of the fabric 2. In that case, the heating of the fabric 2 is performed after the inks and reaction liquid ejected through the nozzles adhere to the fabric 2 and form an image. This improves the dryability of the inks and reaction liquid that have adhered to the fabric 2.

4. EXAMPLES

Aspects of the present disclosure will now be described in further detail with examples, but no aspect of the present disclosure is limited to these examples. In the following, "%" is by mass unless stated otherwise.

4.1 Preparation of Reaction Liquids for Pigment Printing

The individual ingredients were put into containers according to the formulae in Tables 1 to 3 below, and purified water was added to make the total amount of each reaction liquid 100% by mass. After 2 hours of mixing and stirring with a magnetic stirrer, the ingredients were thoroughly mixed by performing dispersion treatment in a bead mill filled with 0.3-mm diameter zirconia beads. After 1 hour of stirring, the mixtures were filtered using a 5-μm PTFE membrane filter. Through this, reaction liquids according to the Examples and Comparative Examples for pigment printing were obtained. The values for the cationic polymer in Tables 1 to 3 below are % by mass based on the solid form, which is the active ingredient.

TABLE 1

| Level | Content | Boiling point | pKa | Example 1 | Example 2 | Example 3 | Example 4 | Example 5 | Example 6 | Example 7 | Example 8 | Example 9 |
|---|---|---|---|---|---|---|---|---|---|---|---|---|
| Polyvalent metal salts | Magnesium chloride | — | | | | | | 3.0% | | | | |
| | Magnesium sulfate | — | | | 3.0% | 3.0% | 3.0% | 3.0% | | | | 3.0% |
| | Aluminum sulfate | | | | | | | | 3.0% | | | |
| | Calcium chloride | — | | | | | | | | 3.0% | | |
| | Calcium nitrate | | | | | | | | | | 3.0% | |
| Organic acid | Lactic acid | | | | | | | | | | | |
| Cationic polymer | SOLENIS Kymene 557 | — | | 2.5% | 2.5% | 2.5% | 2.5% | 2.5% | 2.5% | 2.5% | 2.5% | 2.5% |
| Humectants, polyhydric alcohols | Glycerol | 290° C. | | 13.0% | 13.0% | 13.0% | 13.0% | 13.0% | 13.0% | 13.0% | 13.0% | 13.0% |
| | Propylene glycol | 188° C. | | 13.0% | 13.0% | 13.0% | 13.0% | 13.0% | 13.0% | 13.0% | 13.0% | 13.0% |
| Penetration solvent (monohydric alcohol) | BTG | 278° C. | | | | | | | | | | |
| Lactam | 2-Pyrrolidone | 245° C. | | | | | | | | | | |
| Alkalis | Triethanolamine | — | 7.8 | | | | | | | | | 1.0% |
| | Triisopropanolamine | — | 8.1 | 0.5% | 1.0% | 1.5% | 2.0% | 1.0% | 1.0% | 1.0% | 1.0% | |
| | Trishydroxymethyl-aminomethane | — | 8.1 | | | | | | | | | |
| | Trimethylamine | — | 9.8 | | | | | | | | | |
| | Triethylamine | — | 10.7 | | | | | | | | | |
| | Dimethylamine | — | 10.8 | | | | | | | | | |
| | Diethylamine | — | 10.9 | | | | | | | | | |
| | Methylamine | — | 10.6 | | | | | | | | | |
| | Ethylamine | — | 10.6 | | | | | | | | | |

TABLE 1-continued

| Level | Content | Boiling point | pKa | Example 1 | Example 2 | Example 3 | Example 4 | Example 5 | Example 6 | Example 7 | Example 8 | Example 9 |
|---|---|---|---|---|---|---|---|---|---|---|---|---|
| | Calcium hydroxide | — | 12.7 | | | | | | | | | |
| | Potassium hydroxide | — | 12.9 | | | | | | | | | |
| | Sodium hydroxide | — | 13.0 | | | | | | | | | |
| Surfactant | OLFINE E1010 | — | | 1.0% | 1.0% | 1.0% | 1.0% | 1.0% | 1.0% | 1.0% | 1.0% | 1.0% |
| Metal chelator | EDTA·2Na | — | | 0.02% | 0.02% | 0.02% | 0.02% | 0.02% | 0.02% | 0.02% | 0.02% | 0.02% |
| Antimicrobial | PROXEL XL2 | — | | 0.30% | 0.30% | 0.30% | 0.30% | 0.30% | 0.30% | 0.30% | 0.30% | 0.30% |
| Characteristics | PH (20° C) | | | 6.0 | 7.3 | 7.8 | 8.1 | 7.2 | 6.8 | 7.4 | 6.9 | 8.1 |
| Ratios between amounts | b.p. 230° C or below/b.p. 250° C. or above | | | 1.0 | 1.0 | 1.0 | 1.0 | 1.0 | 1.0 | 1.0 | 1.0 | 1.0 |
| | b.p. 250° C or above/cationic polymer | | | 5.2 | 5.2 | 5.2 | 5.2 | 5.2 | 5.2 | 5.2 | 5.2 | 5.2 |
| | Alkali/cationic polymer | | | 0.2 | 0.4 | 0.6 | 0.8 | 0.4 | 0.4 | 0.4 | 0.4 | 0.4 |
| | Cationic polymer/polyvalent metal salt | | | 0.8 | 0.8 | 0.8 | 0.8 | 0.8 | 0.8 | 0.8 | 0.8 | 0.8 |
| Recording conditions | Ink used | | | Bk | Bk | Bk | Bk | Bk | Bk | Bk | Bk | Bk |
| | Method for the application of the reaction liquid | | | IJ | IJ | IJ | IJ | IJ | IJ | IJ | IJ | IJ |
| Evaluations | Intermittent printing stability | | | A | A | A | A | A | A | A | A | A |
| | Color strength | | | A | A | A | A | A | A | A | A | A |
| | Bleeding | | | A | A | A | A | A | A | A | A | A |
| | Wet rub fastness | Initial | | A | A | A | B | B | A | B | B | A |
| | | Accelerated (60° C.× 5d) | | A | A | A | B | A | A | A | B | A |
| | Pitting corrosion | | | B | A | A | A | B | A | B | B | A |

TABLE 2

| Level | Content | Boiling point | pKa | Example 10 | Example 11 | Example 12 | Example 13 | Example 14 | Example 15 | Example 16 | Example 17 | Example 18 |
|---|---|---|---|---|---|---|---|---|---|---|---|---|
| Polyvalent metal salts | Magnesium chloride | — | | | | | | | | | | |
| | Magnesium sulfate | — | | 3.0% | 3.0% | 3.0% | 3.0% | 3.0% | 3.0% | 3.0% | 3.0% | 3.0% |
| | Aluminum sulfate | | | | | | | | | | | |
| | Calcium chloride | — | | | | | | | | | | |
| | Calcium nitrate | | | | | | | | | | | |
| Organic acid | Lactic acid | | | | | | | | | | | |
| Cationic polymer | SOLENIS Kymene 557 | — | | 2.5% | 2.5% | 2.5% | 2.5% | 2.5% | 2.5% | 2.5% | 2.5% | 2.5% |
| Humectants, polyhydric alcohols | Glycerol | 290° C. | | 13.0% | 13.0% | 13.0% | 13.0% | 13.0% | 13.0% | 13.0% | 6.0% | 0.0% |
| | Propylene glycol | 188° C. | | 13.0% | 13.0% | 13.0% | 13.0% | 13.0% | 13.0% | 13.0% | 20.0% | 26.0% |
| Penetration solvent (monohydric alcohol) | BTG | 278° C. | | | | | | | | | | |
| Lactam | 2-Pyrrolidone | 245° C. | | | | | | | | | | |
| Alkalis | Triethanolamine | — | 7.8 | | | | | | | | | |
| | Triisopropanolamine | — | 8.1 | | | | | | | | | 1.0% | 1.0% |
| | Trishydroxymethyl-aminomethane | — | 8.1 | 1.0% | | | | | | | | |
| | Trimethylamine | — | 9.8 | | 1.0% | | | | | | | |
| | Triethylamine | — | 10.7 | | | 1.0% | | | | | | |
| | Dimethylamine | — | 10.8 | | | | 1.0% | | | | | |
| | Diethylamine | — | 10.9 | | | | | 1.0% | | | | |
| | Methylamine | — | 10.6 | | | | | | 1.0% | | | |
| | Ethylamine | — | 10.6 | | | | | | | 1.0% | | |
| | Calcium hydroxide | — | 12.7 | | | | | | | | | |
| | Potassium hydroxide | — | 12.9 | | | | | | | | | |
| | Sodium hydroxide | — | 13.0 | | | | | | | | | |
| Surfactant | OLFINE E1010 | — | | 1.0% | 1.0% | 1.0% | 1.0% | 1.0% | 1.0% | 1.0% | 1.0% | 1.0% |
| Metal chelator | EDTA·2Na | — | | 0.02% | 0.02% | 0.02% | 0.02% | 0.02% | 0.02% | 0.02% | 0.02% | 0.02% |
| Antimicrobial | PROXEL XL2 | — | | 0.30% | 0.30% | 0.30% | 0.30% | 0.30% | 0.30% | 0.30% | 0.30% | 0.30% |
| Characteristics | pH (20° C) | | | 8.1 | 8.1 | 8.1 | 8.3 | 8.3 | 8.3 | 8.3 | 7.3 | 7.3 |
| Ratios between amounts | b.p. 230° C or below/b.p. 250° C. or above | | | 1.0 | 1.0 | 1.0 | 1.0 | 1.0 | 1.0 | 1.0 | 3.3 | — |
| | b.p. 250° C or above/cationic polymer | | | 5.2 | 5.2 | 5.2 | 5.2 | 5.2 | 5.2 | 5.2 | 2.4 | 0.0 |

TABLE 2-continued

| Level | Content | Boiling point | pKa | Example 10 | Example 11 | Example 12 | Example 13 | Example 14 | Example 15 | Example 16 | Example 17 | Example 18 |
|---|---|---|---|---|---|---|---|---|---|---|---|---|
| | Alkali/cationic polymer | | | 0.4 | 0.4 | 0.4 | 0.4 | 0.4 | 0.4 | 0.4 | 0.4 | 0.4 |
| | Cationic polymer/polyvalent metal salt | | | 0.8 | 0.8 | 0.8 | 0.8 | 0.8 | 0.8 | 0.8 | 0.8 | 0.8 |
| Recording conditions | Ink used | | | Bk | Bk | Bk | Bk | Bk | Bk | Bk | Bk | Bk |
| | Method for the application of the reaction liquid | | | IJ | IJ | IJ | IJ | IJ | IJ | IJ | IJ | IJ |
| Evaluations | Intermittent printing stability | | | A | A | A | A | A | A | A | B | C |
| | Color strength | | | A | A | A | A | A | A | A | A | A |
| | Bleeding | | | A | A | A | A | A | A | A | A | A |
| | Wet rub fastness | Initial | | A | A | A | A | A | A | A | A | A |
| | | Accelerated (60° C. × 5d) | | B | A | B | C | C | C | C | A | A |
| | Pitting corrosion | | | A | A | A | A | A | A | A | A | A |

TABLE 3

| Level | Content | Boiling point | pKa | Comparative Example 19 | Comparative Example 1 | Comparative Example 2 | Comparative Example 3 | Comparative Example 4 | Comparative Example 5 |
|---|---|---|---|---|---|---|---|---|---|
| Polyvalent metal salts | Magnesium chloride | — | | | | | | | |
| | Magnesium sulfate | — | | 3.0% | 3.0% | | 3.0% | | 3.0% |
| | Aluminum sulfate | | | | | | | | |
| | Calcium chloride | — | | | | | | | |
| | Calcium nitrate | | | | | | | | |
| Organic acid | Lactic acid | | | | | 2.0% | | | |
| Cationic polymer | SOLENIS Kymene 557 | — | | 2.0% | 2.5% | | | 2.5% | 2.5% |
| Humectants, polyhydric alcohols | Glycerol | 290° C. | | 13.0% | 13.0% | 15.0% | 13.0% | 13.0% | |
| | Propylene glycol | 188° C. | | 13.0% | 13.0% | 15.0% | 13.0% | 13.0% | |
| Penetration solvent (monohydric alcohol) | BTG | 278° C. | | | | | | | 13.0% |
| Lactam | 2-Pyrrolidone | 245° C. | | | | | | | 13.0% |
| Alkalis | Triethanolamine | — | 7.8 | | | | | | |
| | Triisopropanolamine | — | 8.1 | 1.0% | | | 1.0% | 1.0% | 1.0% |
| | Trishydroxymethyl-aminomethane | — | 8.1 | | | | | | |
| | Trimethylamine | — | 9.8 | | | | | | |
| | Triethylamine | — | 10.7 | | | | | | |
| | Dimethylamine | — | 10.8 | | | | | | |
| | Diethylamine | — | 10.9 | | | | | | |
| | Methylamine | — | 10.6 | | | | | | |
| | Ethylamine | — | 10.6 | | | | | | |
| | Calcium hydroxide | — | 12.7 | | | | | | |
| | Potassium hydroxide | — | 12.9 | | | | | | |
| | Sodium hydroxide | — | 13.0 | | | | | | |
| Surfactant | OLFINE E1010 | — | | 1.0% | 1.0% | 1.0% | 1.0% | 1.0% | 1.0% |
| Metal chelator | EDTA·2Na | — | | 0.02% | 0.02% | 0.02% | 0.02% | 0.02% | 0.02% |
| Antimicrobial | PROXEL XL2 | — | | 0.30% | 0.30% | 0.30% | 0.30% | 0.30% | 0.30% |
| Characteristics | PH (20° C) | | | 7.3 | 7.3 | 2.5 | 9.0 | 7.2 | 7.1 |
| Ratios between amounts | b.p. 230° C or below/b.p. 250° C. or above | | | 1.0 | 1.0 | 1.0 | 1.0 | 1.0 | — |
| | b.p. 250° C or above/cationic polymer | | | 6.5 | 5.2 | — | — | 5.2 | 0.0 |
| | Alkali/cationic polymer | | | 0.5 | 0.0 | — | — | 0.4 | 0.4 |
| | Cationic polymer/polyvalent metal salt | | | 0.7 | 0.8 | — | 0.0 | — | 0.8 |
| Recording conditions | Ink used | | | Bk | Bk | Bk | Bk | Bk | Bk |
| | Method for the application of the reaction liquid | | | IJ | IJ | IJ | IJ | IJ | IJ |
| Evaluations | Intermittent printing stability | | | A | A | A | A | A | B |
| | Color strength | | | A | A | D | A | D | B |
| | Bleeding | | | A | A | C | B | C | C |
| | Wet rub fastness | Initial | | A | A | B | D | A | A |
| | | Accelerated (60° C. × 5d) | | B | D | D | D | D | D |

TABLE 3-continued

| Pitting corrosion | | | A | D | D | A | D | A |
|---|---|---|---|---|---|---|---|---|
| | | | | | | Comparative Example 6 | Comparative Example 7 | Comparative Example 8 |
| Level | Content | Boiling point | pKa | | | | | |
| Polyvalent metal salts | Magnesium chloride | — | | | | | | |
| | Magnesium sulfate | | | | | 3.0% | 3.0% | 3.0% |
| | Aluminum sulfate | — | | | | | | |
| | Calcium chloride | | | | | | | |
| | Calcium nitrate | | | | | | | |
| Organic acid | Lactic acid | | | | | | | |
| Cationic polymer | SOLENIS Kymene 557 | — | | | | 2.5% | 2.5% | 2.5% |
| Humectants, polyhydric alcohols | Glycerol | 290° C. | | | | 13.0% | 13.0% | 13.0% |
| | Propylene glycol | 188° C. | | | | 13.0% | 13.0% | 13.0% |
| Penetration solvent (monohydric alcohol) | BTG | 278° C. | | | | | | |
| Lactam | 2-Pyrrolidone | 245° C. | | | | | | |
| Alkalis | Triethanolamine | — | | | | | | |
| | Triisopropanolamine | — | 8.1 | | | | | |
| | Trishydroxymethyl-aminomethane | — | 8.1 | | | | | |
| | Trimethylamine | — | 9.8 | | | | | |
| | Triethylamine | — | 10.7 | | | | | |
| | Dimethylamine | — | 10.8 | | | | | |
| | Diethylamine | — | 10.9 | | | | | |
| | Methylamine | — | 10.6 | | | | | |
| | Ethylamine | — | 10.6 | | | | | |
| | Calcium hydroxide | — | 12.7 | | | 0.20% | | |
| | Potassium hydroxide | — | 12.9 | | | | 0.20% | |
| | Sodium hydroxide | — | 13.0 | | | | | 0.20% |
| Surfactant | OLFINE E1010 | — | | | | 1.0% | 1.0% | 1.0% |
| Metal chelator | EDTA·2Na | — | | | | 0.02% | 0.02% | 0.02% |
| Antimicrobial | PROXEL XL2 | — | | | | 0.30% | 0.30% | 0.30% |
| Characteristics | PH (20° C) | | | | | 8.5 | 8.5 | 8.5 |
| Ratios between amounts | b.p. 230° C or below/b.p. 250° C. or above | | | | | 1.0 | 1.0 | 1.0 |
| | b.p. 250° C or above/cationic polymer | | | | | 5.2 | 5.2 | 5.2 |
| | Alkali/cationic polymer | | | | | 0.1 | 0.1 | 0.1 |
| | Cationic polymer/polyvalent metal salt | | | | | 0.8 | 0.8 | 0.8 |
| Recording conditions | Ink used | | | | | Bk | Bk | Bk |
| | Method for the application of the reaction liquid | | | | | IJ | IJ | IJ |
| Evaluations | Intermittent printing stability | | | | | A | A | A |
| | Color strength | | | | | A | A | A |
| | Bleeding | | | | | A | A | A |
| | Wet rub fastness | Initial | | | | A | A | A |
| | | Accelerated (60° C. × 5d) | | | | D | D | D |
| | Pitting corrosion | | | | | A | A | A |

The descriptions in Tables 1 to 3 above will be supplemented as follows.

Reaction Liquid Formulae
Cationic Polymer
Kymene 557: The trade name of a SOLENIS product, an epichlorohydrin resin.
Penetrating Solvent
BTG: Triethylene glycol monobutyl ether.
Others
OLFINE E1010: The trade name of a Nissin Chemical Industry product, an acetylene glycol surfactant.
EDTA-2Na: Ethylenediaminetetraacetic acid dihydrogen disodium salt.
PROXEL XL2: The trade name of a Lonza Japan product.

Terms

"Boiling point": Represents the normal boiling point.
"pKa": Represents the acid dissociation constant in water.
"b.p. 230° C. or below/b.p. 250° C. or above": The amount of polyhydric alcohols having a normal boiling point of 230° C. or below/the amount of polyhydric alcohols having a normal boiling point of 250° C. or above.
"b.p. 250° C. or above/cationic polymer": The amount of polyhydric alcohols having a normal boiling point of 250° C. or above/the amount of the cationic polymer.
"Bk": An ink having the formula presented in Table 4 below.
"IJ": Application using ink jet technology.

The pH was measured using a benchtop pH meter (model, F-72; manufacturer, HORIBA). The temperature for the measurement of the pH was 20° C.

4.2 Preparation of a Textile Printing Ink Jet Ink Composition

The individual ingredients were put into a container according to the formula in Table 4 below. After 2 hours of mixing and stirring with a magnetic stirrer, the ingredients were thoroughly mixed by performing dispersion treatment in a bead mill filled with 0.3-mm diameter zirconia beads. After 1 hour of stirring, the mixture was filtered using a 5-μm PTFE membrane filter to give an ink composition. The purified water was added to make the total amount of the ink composition 100% by mass.

For the pigment, a liquid dispersion of pigment was prepared beforehand by mixing a pigment dispersant that was a styrene-acrylic water-soluble resin, not listed in the table, and the pigment into water with the ratio by mass being pigment:pigment dispersant=2:1 and stirring the mixture. This liquid dispersion was used for the preparation of the ink.

TABLE 4

| | | | Bk |
|---|---|---|---|
| Ink formula (% by mass concentration) | Resin particles | UW-1527F (trade name of an Ube Industries, Ltd. product, a urethane resin) | 6.0 |
| | Pigment | Carbon black | 5.0 |
| | Other solvents | Glycerol | 14.0 |
| | | TEG (triethylene glycol) | 4.5 |
| | | BTG (triethylene glycol monobutyl ether) | 1 |
| | | OLFINE E1010 (trade name of a Nissin Chemical Industry product, an acetylene glycol surfactant) | 0.5 |
| | | TEA (triethanolamine) | 1 |
| | | Purified water | Balance |

4.3 Production of Printed Articles

Using an apparatus prepared by modifying PX-H8000 (Seiko Epson Corporation), printing was performed under the conditions specified in Tables 1 to 3 above on a 100% cotton white broadcloth recording medium. A certain scan area was subjected to a main scan multiple times (four times) to form a solid pattern image on the A4-sized piece of fabric as the recording medium. Then the workpiece was dried through 3 minutes of heating treatment at 160° C. in an oven. Through this, printed articles of the Examples and Comparative Examples were produced. The "solid pattern image" refers to an image in which all pixels have a recorded dot (100% duty). A pixel is the smallest unit area for recording determined by the recording resolution.

The ink jet heads were head units having 600 nozzles with a nozzle-to-nozzle pitch of 600 dpi in the direction along the width of the recording medium.

The reaction liquid nozzle assembly and the ink composition nozzle assembly were partially at the same position in the sub-scan direction, and the head arrangement was as in FIG. 3. By virtue of this, the reaction liquid and the ink composition were to be attached to the same scan area of the fabric through the same main scan.

The time lag between the attachment of the ink and the attachment of the reaction liquid was 5 seconds or less.

For the reaction liquid, the recording resolution was 1200×600 dpi, the mass of droplets was 24.2 ng, and the amount of liquid attached was 17.4 mg/inch$^2$.

For the ink, the recording resolution was 1200×600 dpi, the mass of droplets was 24.2 ng, and the amount of ink attached was 17.4 mg/inch$^2$.

4.4 Evaluation Methods 4.4.1 Intermittent Printing Stability

An apparatus prepared by modifying PX-H8000 (Seiko Epson Corporation) was loaded with each of the reaction liquids for pigment printing obtained as described above. After 3 minutes of idle running, the number of missing nozzles was counted on a nozzle check pattern, and intermittent printing stability was evaluated according to the criteria below. An evaluation result of C or better means that good intermittent printing stability has been achieved.

Evaluation Criteria
- A: The number of non-ejecting nozzles is fewer than four
- B: The number of non-ejecting nozzles is four or more and fewer than seven
- C: The number of non-ejecting nozzles is seven or more and fewer than eleven
- D: The number of non-ejecting nozzles is eleven or more 4.4.2 Color Strength For the printed articles obtained as described above, the OD for black was measured using a fluorescent spectrodensitometer ("FD-7," Konica Minolta), and color strength was evaluated according to the criteria below. An evaluation result of B or better means that good color strength has been achieved.

Evaluation Criteria
- A: The OD is 1.45 or greater
- B: The OD is 1.40 or greater and less than 1.45
- C: The OD is 1.35 or greater and less than 1.40
- D: The OD is less than 1.35

4.4.3 Bleeding

The evaluation of bleeding used printed articles similar to those used in the "Wet Rub Fastness" test below. Ink bleeding in the solid pattern on the printed article (spots or unevenness in the shape of streaks in the solid pattern) was visually observed and evaluated according to the evaluation criteria below. When the evaluation result was B or better, it was concluded that there was no bleeding. When the evaluation result was C, it was concluded that there was bleeding.

Evaluation Criteria
- A: No bleeding was observed in the solid pattern
- B: Slight bleeding was observed in the solid pattern
- C: Considerable bleeding was observed in the entire solid pattern 4.4.4 Wet Rub Fastness For the printed articles obtained as described above, the degree of rub fastness was tested by a test method according to ISO 105-X12, and initial wet rub fastness was evaluated according to the criteria below. Accelerated wet rub fastness was evaluated according to the criteria below in the same manner, except that the reaction liquid for pigment printing was used after standing for 5 days in a temperature-controlled bath at 60° C. in advance. An evaluation result of C or better means that good rub fastness has been achieved.

Evaluation Criteria
- A: The degree of rub fastness is grade 3 or better
- B: The degree of rub fastness is grade 2-3 or better and worse than grade 3
- C: The degree of rub fastness is grade 2 or better and worse than grade 2-3
- D: The degree of rub fastness is worse than grade 2

4.4.5 Pitting Corrosion

SUS430, a material commonly used for ink jet heads, was immersed in each of the reaction liquids for pigment printing obtained as described above. The liquid was allowed to stand in an environment at 60° C. and observed for the occurrence of pitting corrosion. When the evaluation result was C or better, it was concluded that there was no pitting corrosion. When the evaluation result was D, it was concluded that there was pitting corrosion. Even when there was pitting corrosion, the use of the printer was possible.

Evaluation Criteria

A: No pitting corrosion even after 400 hours of or longer standing

B: Pitting corrosion occurred in 200 hours or more and less than 400 hours

C: Pitting corrosion occurred in 50 hours or more and less than 200 hours

D: There was pitting corrosion in less than 50 hours 4.5 Evaluation Results

The evaluation results are presented in Tables 1 to 3 above.

The Examples used a reaction liquid for pigment printing that contained a polyvalent metal salt, a cationic polymer, polyhydric alcohols, an alkali, and water, in which the alkali was an amine compound, and that was for use by ejecting the reaction liquid by ink jet technology. As can be seen from Tables 1 to 3 above, in all Examples, color strength and rub fastness were excellent, and pitting corrosion on metal components of the recording apparatus was reduced.

As seen by comparing Example 2 with Comparative Examples 1 and 2, when no alkali was contained, pitting corrosion occurred. As seen by comparing Example 2 with Comparative Examples 6 to 8, when the alkali was not an amine compound, no pitting corrosion occurred, but accelerated wet rub fastness was inferior.

As seen by comparing Example 2 with Comparative Examples 2 and 4, when no polyvalent metal salt was contained, color strength was inferior.

As seen by comparing Example 2 with Comparative Examples 2 and 3, when no cationic polymer was contained, wet rub fastness was inferior.

As seen by comparing Example 2 with Comparative Example 5, when no polyhydric alcohol was contained, accelerated wet rub fastness was inferior.

As seen from the results for Examples 1 to 4, the reduction of pitting corrosion was combined with wet rub fastness over a wide range of amounts of alkali.

As seen from the results for Examples 2 and 5 to 8, the reduction of pitting corrosion was combined with wet rub fastness with various polyvalent metal salts.

As seen from the results for Examples 2 and 9 to 16, the reduction of pitting corrosion was combined with wet rub fastness with various amine compounds. When the amine compound contained a tertiary amine, wet rub fastness was better.

As seen from the results for Examples 2, 17, and 18, when predetermined amounts of polyhydric alcohols having a relatively high normal boiling point were contained, intermittent printing stability was better.

As seen from the results for Examples 2 and 19, when the amount of the cationic polymer was a predetermined amount, accelerated wet rub fastness was better.

The following is derived from the embodiments described above.

A form of a reaction liquid for pigment printing contains:
a polyvalent metal salt;
a cationic polymer;
a polyhydric alcohol;
an alkali; and water, wherein:
the alkali is an amine compound; and
the reaction liquid is used by ejecting the reaction liquid by ink jet technology.

In the above form of a reaction liquid for pigment printing,
the alkali may contain a tertiary amine.

In any of the above forms of a reaction liquid for pigment printing,
the pH of the reaction liquid may be from 5 to 10.

In any of the above forms of a reaction liquid for pigment printing,
the pKa of the alkali may be from 7.0 to 11.0.

In any of the above forms of a reaction liquid for pigment printing,
the amount of the alkali may be from 0.1% to 3.0% by mass of the total amount of the reaction liquid.

In any of the above forms of a reaction liquid for pigment printing,
the polyvalent metal salt may be a sulfate.

In any of the above forms of a reaction liquid for pigment printing,
the polyhydric alcohol may be a polyhydric alcohol having a normal boiling point of 250° C. or above.

A form of an ink set includes:
a textile printing ink jet ink composition containing a pigment, a resin particle, and water; and
the reaction liquid in any of the above forms for pigment printing.

A form of a recording method includes:
an ink attachment step, in which an ink composition is attached to fabric by ink jet technology; and
a reaction liquid attachment step, in which the reaction liquid in any of the above forms for pigment printing is attached to the fabric by ink jet technology.

In the above form of a recording method,
the time lag between the ink attachment step and the reaction liquid attachment step may be 5 seconds or less.

In any of the above forms of a recording method,
the ink jet technology may be one in which a main scan, in which recording is performed by moving an ink jet head in the direction perpendicular to the direction of transport of the fabric, is carried out multiple times;
the reaction liquid for pigment printing and the ink composition may be attached to a certain scan area of the fabric through a certain main scan; and
the certain scan area may be subjected to the certain main scan multiple times.

The present disclosure is not limited to the above embodiments, and many variations are possible. For example, the present disclosure embraces configurations substantially identical to those described in the embodiments, such as configurations identical in function, methodology, and results to or having the same goal and offering the same advantages as the described ones. The present disclosure also includes configurations created by changing any nonessential part of those described in the embodiments. Furthermore, the present disclosure encompasses configurations identical in operation and effect to or capable of fulfilling the same purposes as those described in the embodiments. Configurations obtained by adding any known technology to those described in the embodiments are also part of the present disclosure.

What is claimed is:

1. A reaction liquid for pigment printing, the reaction liquid comprising:
   a polyvalent metal salt;
   a cationic polymer;
   a polyhydric alcohol;
   an alkali; and
   water, wherein:
   the alkali is an amine compound that is different from the cationic polymer; and
   the reaction liquid is used by ejecting the reaction liquid by ink jet technology.

2. The reaction liquid according to claim 1 for pigment printing, wherein
   the alkali contains a tertiary amine.

3. The reaction liquid according to claim 1 for pigment printing, wherein
   a pH of the reaction liquid is from 5 to 10.

4. The reaction liquid according to claim 1 for pigment printing, wherein
   a pKa of the alkali is from 7.0 to 11.0.

5. The reaction liquid according to claim 1 for pigment printing, wherein
   an amount of the alkali is from 0.1% to 3.0% by mass of a total amount of the reaction liquid.

6. The reaction liquid according to claim 1 for pigment printing, wherein
   the polyvalent metal salt is a sulfate.

7. The reaction liquid according to claim 1 for pigment printing, wherein
   the polyhydric alcohol is a polyhydric alcohol having a normal boiling point of 250° C. or above.

8. An ink set comprising:
   a textile printing ink jet ink composition containing a pigment, a resin particle, and water; and
   the reaction liquid according to claim 1 for pigment printing.

9. A recording method comprising:
   an ink attachment step, in which an ink composition is attached to fabric by ink jet technology; and
   a reaction liquid attachment step, in which the reaction liquid according to claim 1 for pigment printing is attached to the fabric by ink jet technology.

10. The recording method according to claim 9, wherein
    a time lag between the ink attachment step and the reaction liquid attachment step is 5 seconds or less.

11. The recording method according to claim 9, wherein:
    the ink jet technology is one in which a main scan, in which recording is performed by moving an ink jet head in a direction perpendicular to a direction of transport of the fabric, is carried out a plurality of times;
    the reaction liquid for pigment printing and the ink composition are attached to a certain scan area of the fabric through a certain main scan; and
    the certain scan area is subjected to the certain main scan a plurality of times.

* * * * *